United States Patent
Iino et al.

(10) Patent No.: US 9,732,798 B2
(45) Date of Patent: Aug. 15, 2017

(54) GREASE FOR ROLLING BEARING

(71) Applicant: SEIKO INSTRUMENTS INC., Chiba-shi, Chiba-ken (JP)

(72) Inventors: Akihiro Iino, Chiba (JP); Yukihiro Nakayama, Chiba (JP); Misato Hanaoka, Chiba (JP); Hisaya Nakamura, Sodegaura (JP); Hiroki Yoda, Sodegaura (JP)

(73) Assignee: SEIKO INSTRUMENTS INC. (JP)

( * ) Notice: Subject to any disclaimer, the term of this patent is extended or adjusted under 35 U.S.C. 154(b) by 0 days.

(21) Appl. No.: 15/002,046

(22) Filed: Jan. 20, 2016

(65) Prior Publication Data

US 2016/0208856 A1    Jul. 21, 2016

(30) Foreign Application Priority Data

Jan. 21, 2015  (JP) ................. 2015-009486
Nov. 30, 2015  (JP) ................. 2015-232905

(51) Int. Cl.
*C10M 107/02*    (2006.01)
*C10M 171/02*    (2006.01)
(Continued)

(52) U.S. Cl.
CPC ....... *F16C 33/6633* (2013.01); *C10M 169/04* (2013.01); *F16C 33/6603* (2013.01);
(Continued)

(58) Field of Classification Search
CPC  F16C 33/6603; F16C 33/6633; F16C 33/664;
F16C 2370/12; C10M 101/00;
(Continued)

(56) References Cited

U.S. PATENT DOCUMENTS 6,656,890 B1 * 12/2003 Fish ................. C10M 169/00
508/570
7,928,045 B2 * 4/2011 Dong ................ C10M 141/06
508/563

(Continued)

FOREIGN PATENT DOCUMENTS

JP    2003239954    8/2003
JP    2013174334    9/2013

OTHER PUBLICATIONS

Lubricant Additives Chemistry and Applications p. 4-43 (2009).*
Naugalube 438L (2001).*
Naugaluge 531 (2001).*

*Primary Examiner* — Pamela H Weiss
(74) *Attorney, Agent, or Firm* — Adams & Wilks

(57) ABSTRACT

A grease composition includes a base oil, a thickener and at least one kind of an antioxidant selected from an amine-based antioxidant and a phenol-based antioxidant expressed by the following respective general formulas (1) and 2:

(1)

(2)

(Continued)

The base oil contains a poly-α-olefin and a mineral oil. A mass ratio of poly-α-olefin/mineral oil is 1.25 to 9.

5 Claims, 7 Drawing Sheets

(51) Int. Cl.
  *C10M 169/06* (2006.01)
  *F16C 33/66* (2006.01)
  *C10M 169/04* (2006.01)
(52) U.S. Cl.
  CPC ............ *C10M 2203/024* (2013.01); *C10M 2203/1006* (2013.01); *C10M 2203/1025* (2013.01); *C10M 2207/026* (2013.01); *C10M 2207/0225* (2013.01); *C10M 2207/0406* (2013.01); *C10M 2207/126* (2013.01); *C10M 2207/128* (2013.01); *C10M 2207/289* (2013.01); *C10M 2207/2835* (2013.01); *C10M 2215/06* (2013.01); *C10M 2215/064* (2013.01); *C10M 2215/1026* (2013.01); *C10M 2215/221* (2013.01); *C10M 2215/223* (2013.01); *C10N 2230/00* (2013.01); *C10N 2230/10* (2013.01); *C10N 2230/12* (2013.01); *C10N 2230/68* (2013.01); *C10N 2240/02* (2013.01); *C10N 2240/204* (2013.01); *C10N 2250/10* (2013.01); *F16C 2370/12* (2013.01)
(58) Field of Classification Search
  CPC C10M 107/00; C10M 107/02; C10M 107/10; C10M 171/005; C10M 2203/1025; C10M 169/04; C10M 2207/0225; C10M 2207/126; C10M 2207/128; C10M 2215/06; C10M 2203/024; C10M 2203/1006; C10M 2215/221; C10M 2207/289; C10M 2207/2835; C10M 2207/0406; C10M 2207/026; C10M 2215/223; C10N 2220/022; C10N 2230/12; C10N 2240/204; C10N 2230/00; C10N 2230/10; C10N 2230/68; C10N 2240/02; C10N 2250/10
  See application file for complete search history.

(56) References Cited

U.S. PATENT DOCUMENTS

| | | | | |
|---|---|---|---|---|
| 2004/0254080 | A1* | 12/2004 | Sivik | C10M 145/10 508/136 |
| 2006/0211581 | A1* | 9/2006 | Bullock | C10G 50/02 508/110 |
| 2007/0000807 | A1* | 1/2007 | Wu | C10M 107/02 208/18 |
| 2007/0155634 | A1* | 7/2007 | Kubota | C10M 169/00 508/363 |
| 2007/0161522 | A1* | 7/2007 | Cholli | C10M 141/00 508/545 |
| 2009/0003742 | A1* | 1/2009 | Nakatani | B60B 27/0005 384/289 |
| 2009/0029881 | A1* | 1/2009 | Okamura | C10M 169/02 508/100 |
| 2010/0323937 | A1* | 12/2010 | Wu | C08F 10/08 508/591 |
| 2011/0183875 | A1* | 7/2011 | Soddemann | C08K 5/09 507/225 |
| 2011/0183876 | A1* | 7/2011 | Imai | C10M 169/06 508/100 |
| 2012/0115763 | A1* | 5/2012 | Patil | C08G 65/20 508/556 |
| 2012/0314985 | A1* | 12/2012 | Saita | C10M 169/06 384/490 |

* cited by examiner

GREASE FOR ROLLING BEARING

BACKGROUND OF THE INVENTION

Field of the Invention

The present invention relates to grease for a rolling bearing, a rolling bearing, a rolling bearing device, and an information recording and reproducing apparatus.

Priority is claimed on Japanese Patent Application No. 2015-009486, filed on Jan. 21, 2015, and Japanese Patent Application No. 2015-232905, filed on Nov. 30, 2015, the content of which is incorporated herein by reference.

Description of Related Art

As an apparatus that magnetically or optically records various kinds of information on a disc and reproduces the information, an information recording and reproducing apparatus such as a hard disk drive (HDD) is known. Typically, the information recording and reproducing apparatus includes a swing arm in which a head gimbal assembly (magnetic head) that records a signal on a disc and reproduces the signal is provided at a tip end, a rolling bearing device that becomes a rotation supporting point of the swing arm, and an actuator that rotates the swing arm. When the magnetic head is moved to a predetermined position on the disc by rotating the swing arm, the recording and reproduction of the signal can be performed.

Typically, the rolling bearing device includes two rolling bearings in which a plurality of spherical rolling bodies are provided between an inner ring and an outer ring, and a shaft that is inserted to an inner side of the rolling bearing. The outer ring rotates around an axis of the shaft due to rolling of the plurality of rolling bodies, and the swing arm that is connected to the outer ring rotates along with the rotation. The rolling bearing is required to stably operate over a long period of time. Accordingly, grease is used to make movement of the rolling bodies between the inner ring and the outer ring smooth.

The grease for the rolling bearing of the information recording and reproducing apparatus is required to lower the torque on the rolling bearing, to obtain excellent torque smoothness (a property in which the torque is constant in a rotation direction of the rolling bearings), and to enhance durability of the rolling bearing. In addition, since outgas from the grease collects in a gap between the magnetic head and the disc, a problem relating to reading and writing occurs in the information recording and reproducing apparatus. Accordingly, it is important that the amount of outgas from the grease for the rolling bearing is small.

Recently, along with an increase in density of HDDs or an increase in demand for a server use, an operation range or an operation speed of a swing arm of the HDD, and an environmental temperature at which the HDD is used has become wide. According to this, grease, which is provided to a rolling bearing device that becomes a rotation supporting point of the swing arm, is exposed to a temperature or lubrication conditions which vary variously in use of the HDD.

As grease for the rolling bearing of an information recording and reproducing apparatus which is used under this environment, for example, Patent Document 1 discloses grease which contains a base oil containing a mineral oil and poly-α-olefin (hereinafter, referred to as "PAO"), a thickener (a urea compound and the like), and an extreme pressure agent (an organic phosphorous compound and the like), and which is excellent in torque stability and durability. Patent Document 2 discloses grease which contains a base oil composed of PAO, a thickener composed of a diurea compound, and a metal carbamate, and is capable of reducing outgas.

DOCUMENTS OF RELATED ART

Patent Document

[Patent Document 1] Japanese Unexamined Patent Application, First Publication No. 2003-239954
[Patent Document 2] Japanese Unexamined Patent Application, First Publication No. 2013-174334

SUMMARY OF THE INVENTION

It is considered that outgas, which is generated from grease, attaches a magnetic head and a disc to each other, and becomes a main cause for occurrence of an operation failure. Accordingly, it is confirmed whether or not the amount of outgas of the rolling bearing device is in a predetermined range prior to shipment.

The present inventors have come to the following conclusion. In addition to outgas at an initial stage prior to use of the HDD, in a case where the grease is oxidatively degraded due to an effect of a temperature that varies variously during use of the HDD, and outgas is likely to be generated, the HDD is greatly affected by such a situation. Accordingly, an HDD with high reliability can be obtained by suppressing the oxidative degradation. In addition, when the oxidative degradation of the grease progresses, since a lubrication failure occurs, the lubrication failure also has an effect on durability of the rolling bearing that contains the grease. Accordingly, it is preferable to suppress the oxidative degradation of the grease also in consideration of obtaining of an HDD having excellent durability.

However, in the technologies of Patent Documents 1 and 2, an effect of reducing outgas is not sufficiently achieved. In addition, in Patent Documents 1 and 2, the oxidative degradation of the grease during use of the HDD is not taken into consideration.

An object of the invention is to provide grease for a rolling bearing which is excellent in an effect of reducing the amount of outgas. In addition, another object of the invention is to provide grease for a rolling bearing which is capable of satisfactorily suppressing oxidative degradation in use of an information reducing and reproducing apparatus, and is excellent in durability.

In addition, still another object of the invention is to provide a rolling bearing that uses the grease for a rolling bearing, a rolling bearing device, and an information recording and reproducing apparatus.

According to an aspect of the invention, there is provided grease for a rolling bearing. The grease for a rolling bearing contains a base oil, a thickener, and at least one kind of an antioxidant selected from an amine-based antioxidant (A) expressed by the following General Formula (1), and a phenol-based antioxidant (B) expressed by the following General Formula (2).

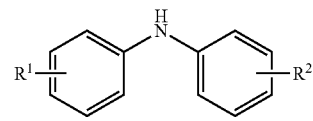

(1)

(In Formula (1), $R^1$ and $R^2$ each independently represents an alkyl group having 1 to 12 carbon atoms, or a hydrogen atom, provided that, at least one of $R^1$ and $R^2$ is an alkyl group having 1 to 12 carbon atoms)

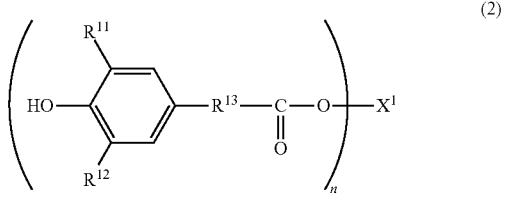

(2)

(In Formula (2), $R^{11}$ and $R^{12}$ each independently represents an alkyl group having 1 to 8 carbon atoms, $R^{13}$ represents an alkylene group having 1 to 8 carbon atoms, and n represents a number of 1 to 6. $X^1$ represents a residue obtained after n hydroxyl groups are removed from an aliphatic m-hydric alcohol having 1 to 24 carbon atoms, m represents a number of 1 to 6 which is equal to or greater than n, provided that, when n is 5 or 6, the number of carbon atoms of the aliphatic m-hydric alcohol in $X^1$ is 2 to 24.)

The grease for a rolling bearing of the invention may contain both the amine-based antioxidant (A) and the phenol-based antioxidant (B).

The grease for a rolling bearing of the invention may contain the amine-based antioxidant (A) in an amount greater than that of the phenol-based antioxidant (B) on a mass basis.

In the grease for a rolling bearing of the invention, the base oil may contain a refined mineral oil that is classified as Group III in a base oil category defined by the American Petroleum Institute (API), and the flash point of the refined mineral oil may be 240° C. or higher, and more preferably 250° C. or higher.

In the grease for a rolling bearing of the invention, the base oil may contain a mixture of trimers to pentamers of α-olefin having 8 to 12 carbon atoms.

The grease for a rolling bearing of the invention may be used for a rolling bearing of an information recording and reproducing apparatus.

The grease for a rolling bearing of the invention may be used for a rolling bearing of an apparatus of manufacturing an electronic apparatus.

According to another aspect of the invention, there is provided a rolling bearing including the grease for a rolling bearing of the invention.

According to still another aspect of the invention, there is provided a rolling bearing device including a shaft, and the rolling bearing of the invention.

According to still another aspect of the invention, there is provided an information recording and reproducing apparatus including the rolling bearing device of the invention.

The grease for a rolling bearing of the invention is excellent in an effect of reducing the amount of outgas. In addition, the grease can satisfactorily suppress oxidative degradation of an information recording apparatus in use. In addition, the grease has excellent durability in the rolling bearing.

In addition, in the rolling bearing, the rolling bearing device, and the information recording and reproducing apparatus of the invention, the amount of outgas from the grease for a rolling bearing is reduced. In addition, the oxidative degradation of the grease is suppressed in use of the information recording and reproducing apparatus. Accordingly, excellent durability is attained.

DETAILED DESCRIPTION OF THE INVENTION

Grease for Rolling Bearing

Figure 1:
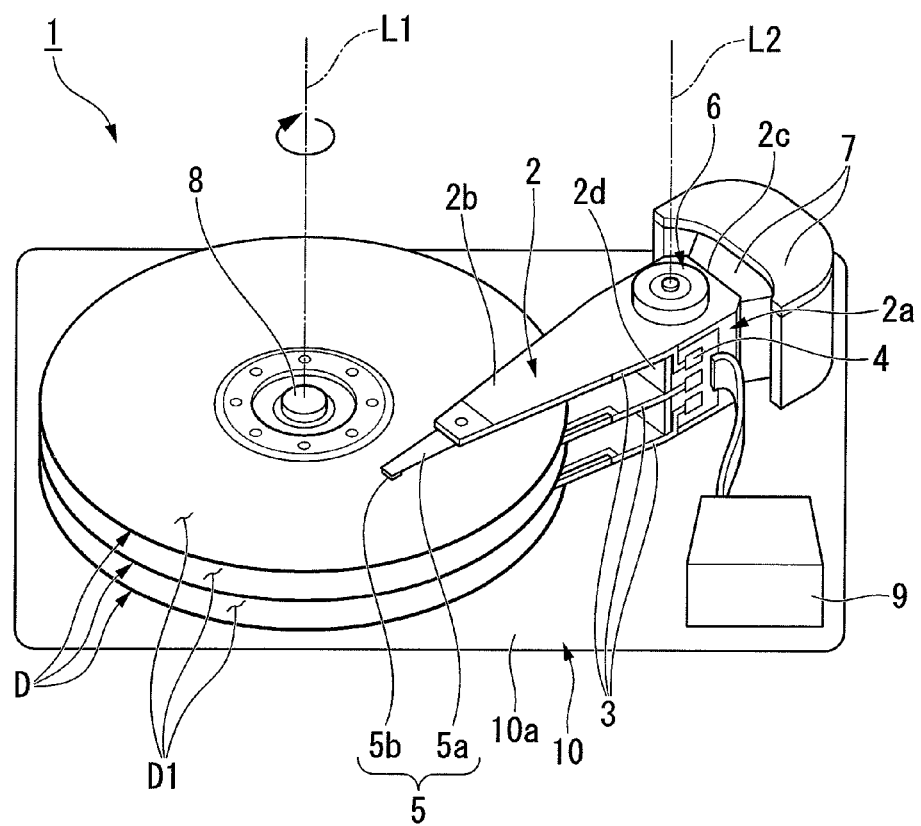
FIG. 1 is a perspective view illustrating an example of an information recording and reproducing apparatus of the invention.

Grease for a rolling bearing (hereinafter, may also be referred to simply as "grease") of the invention includes a base oil, a thickener, and at least one kind of an antioxidant selected from a specific amine-based antioxidant (A) and a specific phenol-based antioxidant (B).

Antioxidant

The antioxidant that is included in the invention is at least one kind that is selected from the specific amine-based antioxidant (A) (hereinafter, may also be referred to simply as "component (A)"), and the specific phenol-based antioxidant (B) (hereinafter, may also be referred to simply as "component (B)").

When the grease of the invention contains at least one kind of the antioxidant selected from the component (A) and the component (B), the amount of outgas is reduced. In addition, it is possible to satisfactorily suppress oxidative degradation that occurs in use of an information recording and reproducing apparatus, in which the grease of the invention is used, due to various variations in a temperature. According to this, even in an initial stage immediately after initiation of use of the information recording and reproducing apparatus or even in a state in which the use (driving) of the information recording and reproducing apparatus is stopped (that is, in a low-temperature stage), but also even in use (that is, a high-temperature stage), it is possible to reduce the amount of outgas. In addition, it is possible to suppress a lubrication failure due to the oxidative degradation of the grease. Accordingly, it is possible to enhance the durability.

Component (A)

The component (A) is an amine-based antioxidant expressed by the following General Formula (1).

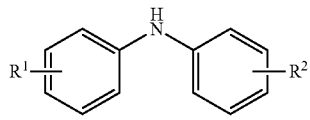

(In Formula (1), $R^1$ and $R^2$ each independently represents an alkyl group having 1 to 12 carbon atoms, or a hydrogen atom, provided that, at least one of $R^1$ and $R^2$ is an alkyl group having 1 to 12 carbon atoms)

It is preferable that $R^1$ and $R^2$ in General Formula (1) each independently represents alkyl groups having 1 to 12 carbon atoms, and more preferably alkyl groups having 4 to 12 carbon atoms. Each of the alkyl groups may be a straight chain or a branched chain. Examples of the alkyl group include a methyl group, an ethyl group, an n-propyl group, an i-propyl group, an n-butyl group, an i-butyl group, a t-butyl group, an n-pentyl group, an i-pentyl group, a neopentyl group, a t-pentyl group, a 2-methylbutyl group, an n-hexyl group, an i-hexyl group, a 3-methylpentyl group, an ethylbutyl group, an n-heptyl group, a 2-methylhexyl group, an n-octyl group, an i-octyl group, a 2-ethylhexyl group, an 3-methyl heptyl group, a 1,1,3,3-tetramethylbutyl group, an n-nonyl group, an i-nonyl group, an 1-methyl octyl group, an ethyl heptyl group, an n-decyl group, a 1-methylnonyl group, an n-undecyl group, a 1,1-dimethyl-nonyl group, an n-dodecyl group, and the like.

Each of the alkyl groups, which are represented by $R^1$ and $R^2$, may be bonded to an arbitrary position of a phenyl group, but it is preferable to be p-coordinated to an amino group.

Examples of the component (A) include monooctyl diphenylamine, mononyl diphenylamine, di(4-butylphenyl)amine, di(4-hexyl-phenyl)amine, di(4-octylphenyl)amine, di(4-nonylphenyl)amine, and the like. Among these, di(4-octylphenyl)amine is preferable. In addition, as the component (A), a reaction product of N-phenylbenzenamine and 2,4,4-trimethylpentene and the like may be used.

As the component (A), one kind thereof may be used alone, or two or more kinds thereof may be used in combination.

Although not particularly limited, it is preferable that the amount of the component (A) contained is 0.05% by mass to 2% by mass on the basis of the total mass of the grease, and more preferably 0.1% by mass to 1% by mass. When the amount of the component (A) contained is in the preferable range, it is easy to reduce the amount of outgas. In addition, it is easy to suppress the oxidative degradation of the grease. According to this, even during use of the information recording and reproducing apparatus, it is easy to suppress occurrence of outgas. Accordingly, it is easy to reduce the total amount of outgas in use of the rolling bearing after manufacturing of the rolling bearing. In addition, it is easy to suppress the lubrication failure due to the oxidative degradation of the grease. Accordingly, it is easy to enhance the durability.

Component (B)

The component (B) is a phenol-based antioxidant expressed by the following General Formula (2).

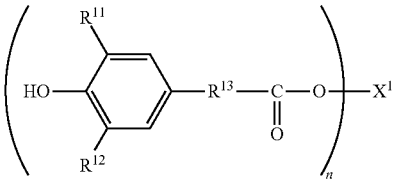

(In Formula (2), $R^{11}$ and $R^{12}$ each independently represents an alkyl group having 1 to 8 carbon atoms, $R^{13}$ represents an alkylene group having 1 to 8 carbon atoms, and n represents a number of 1 to 6. $X^1$ represents a residue obtained after n hydroxyl groups are removed from an aliphatic m-hydric alcohol having 1 to 24 carbon atoms, m represents a number of 1 to 6 which is equal to or greater than n, provided that, when n is 5 or 6, the number of carbon atoms of the aliphatic m-hydric alcohol in $X^1$ is 2 to 24.)

In General Formula (2), $R^{11}$ and $R^{12}$ each independently represents an alkyl group having 1 to 8 carbon atoms, preferably an alkyl group having 2 to 6 carbon atoms, and more preferably an alkyl group having 3 to 5 carbon atoms. Each of the alkyl groups may be straight chain or a branched chain. Examples of the alkyl group include a methyl group, an ethyl group, an n-propyl group, an i-propyl group, an n-butyl group, an i-butyl group, a t-butyl group, an n-pentyl group, an i-pentyl group, a neopentyl group, a t-pentyl group, a 2-methylbutyl group, an n-hexyl group, an i-hexyl group, a 3-methylpentyl group, an ethylbutyl group, an n-heptyl group, a 2-methylhexyl group, an n-octyl group, an i-octyl group, a 2-ethylhexyl group, a 3-methyl heptyl group, a 1,1,3,3-tetramethylbutyl group, and the like. Among the alkyl groups, the t-butyl group is preferable, and it is more preferable that both of $R^{11}$ and $R^{12}$ are t-butyl group.

$R^{13}$ represents an alkylene group having 1 to 8 carbon atoms, and preferably an alkylene group having 1 to 3 carbon atoms. The alkylene group may be a straight chain or may have a branched chain. Examples of the alkylene group include a methylene group, an ethylene group, an n-propylene group, a 1,2-propylene group, an n-butylene group, a 1,2-butylene group, an n-hexylene group, an n-heptylene group, an n-octylene, and the like. Among the alkylene groups, the ethylene group is preferable.

n represents a number of 1 to 6, and preferably 1 to 4.

$X^1$ represents a residue after n hydroxyl groups are removed from aliphatic m-hydric alcohol having 1 to 24 carbon atoms, and m represents a number of 1 to 6. That is, $X^1$ represents a residue after n hydroxyl groups are removed from aliphatic monohydric to hexahydric alcohols having 1 to 24 carbon atoms.

Examples of the monohydric to hexahydric alcohols having 1 to 24 carbon atoms in $X^1$ include monohydric alcohols such as methanol, ethanol, n-propanol, i-propanol, n-butanol, t-butanol, n-pentanol, 2-methyl butanol, 3-methyl butanol, 2,2-dimethyl-propanol, n-hexanol, 2-methyl pentanol, 2-ethyl butanol, 2,3-dimethyl butanol, n-heptanol, 2-methyl-hexanol, 3-methyl-hexanol, 5-methyl-hexanol, n-octanol, 2-ethylhexanol, n-nonanol, 3,5,5-trimethyl hexanol, decyl alcohol, and 2,4,6-trimethyl heptanol, hindered alcohols such as neopentyl glycol, trimethylol ethane, trimethylol propane, pentaerythritol, ditrimethylol propane, and dipentaerythritol, polyhydric alcohols such as ethylene glycol, diethylene glycol, propylene glycol, dipropylene glycol, 1,3-propanediol, 1,4-butanediol, 1,6-hexanediol, glycerol, diglycerol, triglycerol, sorbitol, and mannitol. Among these, the monohydric alcohols and the hindered alcohols are preferable.

Examples of the component (B) include phenol-based antioxidants expressed by the following General Formula (3) to General Formula (8).

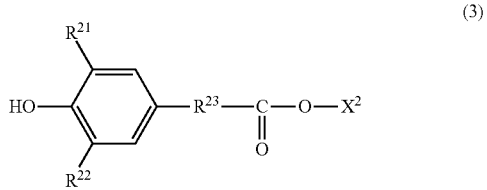

(3)

(In Formula (3), $R^{21}$ and $R^{22}$ each independently represents an alkyl group having 1 to 8 carbon atoms, $R^{23}$ represents an alkylene group having 1 to 8 carbon atoms, $X^2$ represents a residue after one hydroxyl group is removed from aliphatic monohydric to hexahydric alcohols having 1 to 24 carbon atoms.)

$R^{21}$ and $R^{22}$ in Formula (3) are the same as $R^{11}$ and $R^{12}$ in Formula (2), respectively. In addition, $R^{23}$ in Formula (3) is the same as $R^{13}$ in Formula (2).

Examples of $X^2$ in Formula (3) include monohydric aliphatic hydrocarbon group having 1 to 24 carbon atoms.

The aliphatic hydrocarbon group may be a straight chain or a branched chain. The aliphatic hydrocarbon group may be a saturated aliphatic hydrocarbon group, or an unsaturated aliphatic hydrocarbon group. In addition, the aliphatic hydrocarbon group may have or may not have an ether bond between carbon atoms. In addition, the aliphatic hydrocarbon group may be or may not be substituted with a hydroxy group.

As $X^2$, a monohydric saturated aliphatic hydrocarbon group having 1 to 24 carbon atoms is preferable, and a monohydric saturated aliphatic hydrocarbon group having 1 to 18 carbon atoms is more preferable.

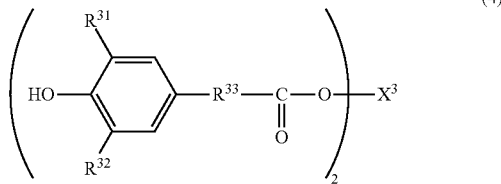

(4)

(In Formula (4), $R^{31}$ and $R^{32}$ each independently represents an alkyl group having 1 to 8 carbon atoms, $R^{33}$ represents an alkylene group having 1 to 8 carbon atoms, $X^3$ represents a residue after two hydroxyl groups are removed from aliphatic dihydric to hexahydric alcohols having 1 to 24 carbon atoms.)

$R^{31}$ and $R^{32}$ in Formula (4) are the same as $R^{11}$ and $R^{12}$ in Formula (2), respectively. In addition, $R^{33}$ in Formula (4) is the same as $R^{13}$ in Formula (2).

Examples of $X^3$ in Formula (4) include a dihydric aliphatic hydrocarbon group having 1 to 24 carbon atoms.

The aliphatic hydrocarbon group may be a straight chain or a branched chain. The aliphatic hydrocarbon group may be a saturated aliphatic hydrocarbon group, or an unsaturated aliphatic hydrocarbon group. In addition, the aliphatic hydrocarbon group may have or may not have an ether bond between carbon atoms. In addition, the aliphatic hydrocarbon group may be or may not be substituted with a hydroxy group.

As $X^3$, a dihydric saturated aliphatic hydrocarbon group having 1 to 24 carbon atoms, which may have an ether bond between carbon atoms, is preferable, and a dihydric saturated aliphatic hydrocarbon group having 2 to 18 carbon atoms, which may have an ether bond between carbon atoms, is more preferable.

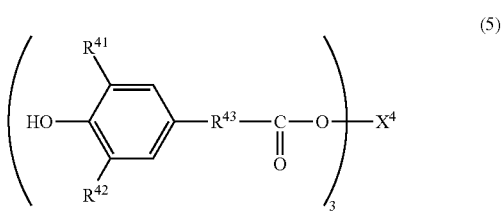

(5)

(In Formula (5), $R^{41}$ and $R^{42}$ each independently represents an alkyl group having 1 to 8 carbon atoms, $R^{43}$ represents an alkylene group having 1 to 8 carbon atoms, $X^4$ represents a residue after three hydroxyl groups are removed from aliphatic trihydric to hexahydric alcohols having 1 to 24 carbon atoms.)

$R^{41}$ and $R^{42}$ in Formula (5) are the same as and $R^{12}$ in Formula (2), respectively. In addition, $R^{43}$ in Formula (5) is the same as $R^{13}$ in Formula (2).

Examples of $X^4$ in Formula (5) include trihydric aliphatic hydrocarbon group having 1 to 24 carbon atoms.

The aliphatic hydrocarbon group may be a straight chain or a branched chain. The aliphatic hydrocarbon group may be a saturated aliphatic hydrocarbon group, or an unsaturated aliphatic hydrocarbon group. In addition, the aliphatic hydrocarbon group may have or may not have an ether bond between carbon atoms. In addition, the aliphatic hydrocarbon group may be or may not be substituted with a hydroxy group.

As $X^4$, a trihydric saturated aliphatic hydrocarbon group having 1 to 24 carbon atoms, which may have an ether bond between carbon atoms, is preferable, and a trihydric saturated aliphatic hydrocarbon group having 3 to 18 carbon atoms, which may have an ether bond between carbon atoms, is more preferable.

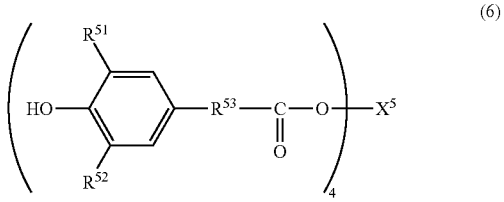

(6)

(In Formula (6), $R^{51}$ and $R^{52}$ each independently represents an alkyl group having 1 to 8 carbon atoms, $R^{53}$ represents an alkylene group having 1 to 8 carbon atoms, $X^5$ represents a residue after four hydroxyl groups are removed from aliphatic tetrahydric to hexahydric alcohols having 1 to 24 carbon atoms.)

$R^{51}$ and $R^{52}$ in Formula (6) are the same as $R^{11}$ and $R^{12}$ in Formula (2), respectively. In addition, $R^{53}$ in Formula (6) is the same as $R^{13}$ in Formula (2).

Examples of $X^5$ in Formula (6) include tetrahydric aliphatic hydrocarbon group having 1 to 24 carbon atoms.

The aliphatic hydrocarbon group may be a straight chain or a branched chain. The aliphatic hydrocarbon group may be a saturated aliphatic hydrocarbon group, or an unsaturated aliphatic hydrocarbon group. In addition, the aliphatic hydrocarbon group may have or may not have an ether bond between carbon atoms. In addition, the aliphatic hydrocarbon group may be or may not be substituted with a hydroxy group.

As $X^5$, a tetrahydric saturated aliphatic hydrocarbon group having 1 to 24 carbon atoms, which may have an ether bond between carbon atoms, is preferable, and a tetrahydric saturated aliphatic hydrocarbon group having 4 to 18 carbon atoms, which may have an ether bond between carbon atoms, is more preferable.

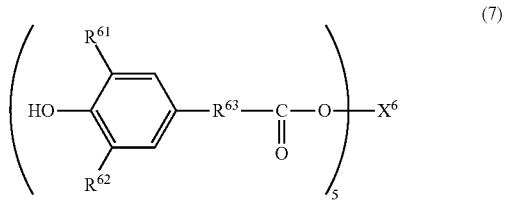

(7)

(In Formula (7), $R^{61}$ and $R^{62}$ each independently represents an alkyl group having 1 to 8 carbon atoms, $R^{63}$ represents an alkylene group having 1 to 8 carbon atoms, $X^6$ represents a residue after five hydroxyl groups are removed from aliphatic pentahydric to hexahydric alcohols having 2 to 24 carbon atoms.)

R61 and $R^{62}$ in Formula (7) are the same as $R^{11}$ and $R^{12}$ in Formula (2), respectively. In addition, $R^{63}$ in Formula (7) is the same as $R^{13}$ in Formula (2).

Examples of $X^6$ in Formula (7) include pentahydric aliphatic hydrocarbon group having 1 to 24 carbon atoms.

The aliphatic hydrocarbon group may be a straight chain or a branched chain. The aliphatic hydrocarbon group may be a saturated aliphatic hydrocarbon group, or an unsaturated aliphatic hydrocarbon group. In addition, the aliphatic hydrocarbon group may have or may not have an ether bond between carbon atoms. In addition, the aliphatic hydrocarbon group may be or may not be substituted with a hydroxy group.

As $X^6$, a pentahydric saturated aliphatic hydrocarbon group having 2 to 24 carbon atoms, which may have an ether bond between carbon atoms, is preferable, and a pentahydric saturated aliphatic hydrocarbon group having 5 to 18 carbon atoms, which may have an ether bond between carbon atoms, is more preferable.

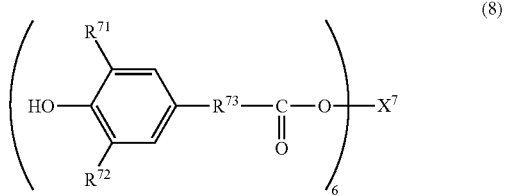

(8)

(In Formula (8), $R^{71}$ and $R^{72}$ each independently represents an alkyl group having 1 to 8 carbon atoms, $R^{73}$ represents an alkylene group having 1 to 8 carbon atoms, $X^7$ represents a residue after six hydroxyl groups are removed from aliphatic hexahydric alcohol having 2 to 24 carbon atoms.)

$R^{71}$ and $R^{72}$ in Formula (8) are the same as $R^{11}$ and $R^{12}$ in Formula (2), respectively. In addition, $R^{73}$ in Formula (8) is the same as $R^{13}$ in Formula (2).

Examples of $X^7$ in Formula (8) include hexahydric aliphatic hydrocarbon group having 1 to 24 carbon atoms.

The aliphatic hydrocarbon group may be a straight chain or a branched chain. The aliphatic hydrocarbon group may be a saturated aliphatic hydrocarbon group, or an unsaturated aliphatic hydrocarbon group. In addition, the aliphatic hydrocarbon group may have or may not have an ether bond between carbon atoms.

As $X^7$, a hexahydric saturated aliphatic hydrocarbon group having 2 to 24 carbon atoms, which may have an ether bond between carbon atoms, is preferable, and a hexahydric saturated aliphatic hydrocarbon group having 6 to 18 carbon atoms, which may have an ether bond between carbon atoms, is more preferable.

Examples of the component (B) include octyl 3-(4-hydroxy-3,5-di-t-butylphenyl)propionate, decyl 3-(4-hydroxy-3,5-di-t-butylphenyl)propionate, dodecyl 3-(4-hydroxy-3,5-di-t-butylphenyl)propionate, stearyl 3-(4-hydroxy-3,5-di-t-butylphenyl)propionate, oleyl 3-(4-hydroxy-3,5-di-t-butylphenyl)propionate, benzene propanoic acid, 3,5-bis(1,1-dimethylethyl)-4-hydroxy C7-C9 side chain alkyl ester, tetramethylene bis[3-(3,5-di-t-butyl-4-hydroxyphenyl)propionate], hexamethylene bis[3-(3,5-di-t-butyl-4-hydroxyphenyl)propionate], pentaerythritol tetrakis[3-(3,5-di-t-butyl-4-hydroxyphenyl)propionate], 3-(4-hydroxy-3,5-di-t-butyl-phenyl)propionic acid glycerin monoester, and the like. Among these, benzene propanoic acid, 3,5-bis(1,1-dimethylethyl)-4-hydroxy C7-C9 side chain alkyl ester, and pentaerythritol tetrakis[3-(3,5-di-t-butyl-4-hydroxyphenyl)propionate] are preferable.

As the component (B), one kind thereof may be used alone, or two or more kinds thereof may be used in combination.

Although not particularly limited, it is preferable that the amount of the component (B) contained is 0.05% by mass to 2% by mass on the basis of the total mass of the grease, and more preferably 0.1% by mass to 1% by mass. When the amount of the component (B) contained is in the preferable range, it is easy to suppress generation of outgas. In addition, it is easy to suppress the oxidative degradation of the grease. According to this, even during use of the information recording and reproducing apparatus, it is easy to suppress occurrence of outgas. Accordingly, it is easy to reduce the total amount of outgas in use of the rolling bearing after manufacturing of the rolling bearing. In addition, it is easy to suppress the lubrication failure due to the oxidative degradation of the grease. Accordingly, it is easy to enhance the durability.

In at least one kind antioxidant selected between the component (A) and the component (B), it is preferable to use the component (B) when considering that it is relatively easy to attain the effect of the invention. In addition, it is preferable to use the component (A) and the component (B) in combination. The component (A) is excellent in an oxidation preventing effect at a relatively higher temperature higher than 100° C., and the component (B) is excellent in an oxidation preventing effect from room temperature to approximately 100° C. In the rolling bearing of the information recording and reproducing apparatus, an operation range or an operation speed of the swing arm, and an environmental temperature in use are wide, and the grease provided in the bearing is exposed to a temperature that varies variously. In a case where the component (A) and the component (B) are used in combination, even when being exposed to a temperature that varies variously, it is possible to reliably prevent the oxidative degradation of the grease.

In a case where the component (A) and the component (B) are used in combination, it is preferable that the total amount of the component (A) and the component (B) which are contained is 0.1% by mass to 4% by mass on the basis of the total mass of the grease, and more preferably 0.2% by mass to 2% by mass. In addition, it is preferable that a mass ratio between the component (A) and the component (B) [the amount of the component (A) contained/the amount of component (B) contained] is 9/1 to 5/5, more preferably 8/2 to 5/5, and still more preferably 8/2 to 6/4.

In the above-described preferable range, it is possible to further reduce the amount of outgas.

Base Oil

Although not particularly limited, examples of the base oil that is blended to the grease of the invention include a mineral oil, a synthetic oil, and the like.

As the mineral oil, a mineral oil that is known and is used as the base oil can be used, and examples thereof include a naphthenic mineral oil, a paraffinic mineral oil, a hydrogenated mineral oil, a solvent-refined mineral oil, a highly refined mineral oil, and the like.

As the mineral oil, one kind thereof may be used alone, or two or more kinds thereof may be used in combination. For example, a plurality of mineral oils, which have kinematic viscosities different from each other, may be mixed with each other for adjustment to a target kinematic viscosity (average kinematic viscosity).

As the mineral oil, a refined mineral oil, which is classified as Group III (Gr III) in a base oil category defined by the American petroleum Institute (API), is preferable when considering that grease, in which the amount of outgas is relatively small, and heat resistance is excellent, is obtained. Examples of the refined mineral oil include paraffinic mineral oil that is obtained by subjecting a lubricating oil distillate, which is obtained through atmospheric distillation of crude oil, to high hydrogenation refining, and the like. In the refined mineral oil classified as Group III, it is preferable that the flash point is 240° C. or higher, and more preferably 250° C. or higher. The refined mineral oil has a high degree of refinement and can further reduce the amount of outgas. From this reason, it is assumed that a low-molecular-weight component, which becomes a cause for outgas, is reduced.

As the synthetic oil, a synthetic oil that is known and is used as the base oil can be used, and examples thereof include an aliphatic hydrocarbon oil such as poly-α-olefin (PAO) and polybutene, an aromatic hydrocarbon oil such as akylbenzene, alkylnaphthalene, an ester oil such as polyol ester and phosphoric acid ester, an ether oil such as polyphenyl ether, a polyalkylene glycol oil, a silicone oil, a fluorine oil, and the like.

As the synthetic oils, one kind thereof may be used alone, or two or more kinds thereof may be used in combination.

As the synthetic oils, it is preferable to use PAO. As the PAO, PAO that is known and is used as the base oil can be used without limitation, and examples thereof include trimers to pentamers in which α-olefin (1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, and the like) is set as a raw material), a mixture of the trimers to the pentamer, and the like. Among these, as the PAO, a mixture of the trimers to the pentamers of the α-olefin having 8 to 12 carbon atoms is preferable when considering that the amount of outgas is reduced, an evaporation loss at a high temperature is reduced, the oxidative degradation is suppressed, and an appropriate viscosity is obtained. For example, as an appropriate viscosity range of the mixture, 27 mm$^2$/s to 54 mm$^2$/s (cSt) at 40° C. can be exemplified. As the trimer to pentamers of the α-olefin having 8 to 12 carbon atoms, one kind thereof may be used alone, or two or more kinds thereof may be used in combination.

As the PAO, one kind may be used, or two or more kinds thereof may be used in combination. For example, a plurality of kinds of PAO, which have kinematic viscosities different from each other, may be mixed with each other for adjustment to a target kinematic viscosity (average kinematic viscosity).

As the base oil, it is preferable to use the mineral oil and the PAO in combination. In this case, it is preferable that a proportion of the mineral oil in 100% by mass of base oil is 10% by mass to 40% by mass. In addition, it is preferable that the proportion of the PAO contained in the base oil is greater than the proportion of the mineral oil contained in the base oil.

In addition, it is preferable that a kinematic viscosity $v_1$ of the mineral oil at 40° C. is set to be higher than a kinematic viscosity $v_2$ of the PAO at 40° C. When the kinematic viscosity $v_1$ of the mineral oil is higher than the kinematic viscosity $v_2$ of the PAO, heat resistance of the mineral oil is likely to be enhanced. As a result, the amount of outgas from the mineral oil decreases, and as a result, the amount of outgas from the base oil is likely to decrease. In addition, when the PAO having kinematic viscosity $v_2$ lower than the kinematic viscosity $v_1$ of the mineral oil is used in combination, the kinematic viscosity v of the base oil is lowered. According to this, it is easy to supply the grease to a portion of the rolling bearing at which rolling bodies are rolled. Accordingly, it is easy to obtain a lubricating effect due to the grease.

In addition, the kinematic viscosity of the oil in the invention represents a value that is measured at 40° C. in conformity to JIS K 2283.

In addition, in a case where a plurality of the same kind of base oils, which have kinematic viscosities different from each other, are mixed, the kinematic viscosity of the resultant mixture is regarded as a kinematic viscosity of the base oil that is contained in the grease of the invention.

It is preferable that a ratio $v_1/v_2$ of the kinematic viscosity $v_1$ of the mineral oil to the kinematic viscosity $v_2$ of the PAO is 1.3 or greater when considering that it is easy to further reduce the amount of outgas, and more preferably 1.5 or greater. In addition, it is preferable that the ratio $v_1/v_2$ is 4 or less in consideration of low torque of the rolling bearing, and more preferably 2 or less.

It is preferable that the kinematic viscosity $v_1$ of the mineral oil is 40 mm$^2$/s or greater when considering that it is easier to reduce the amount of outgas, and more preferably 45 mm$^2$/s or greater. In addition, it is preferable that the kinematic viscosity $v_1$ of the mineral oil is 80 mm$^2$/s or less when considering that it is easy to supply the grease or the base oil to a rolling surface of the rolling bearing, and more preferably 60 mm$^2$/s or less.

It is preferable that the kinematic viscosity $v_2$ of the PAO is 20 mm$^2$/s or greater when considering that it is easy to further reduce the amount of outgas, and more preferably 30 mm$^2$/s or greater. In addition, it is preferable that the kinematic viscosity $v_2$ of the PAO is 60 mm²/s or less when considering that it is easy for the rolling bodies to supply the grease or the base oil to the rolling surface of the rolling bearing, and more preferably 40 mm²/s or less.

It is preferable that the kinematic viscosity v of the base oil at 40° C. is 25 mm²/s to 45 mm²/s, and more preferably 30 mm²/s to 40 mm²/s. When the kinematic viscosity v of the base oil is equal to or greater than the lower limit, it is ease to further reduce the amount of outgas. When the kinematic viscosity v of the base oil is equal to or less than the upper limit, it is easy to supply the grease or the base oil to the rolling surface of the rolling bearing. In addition, it is easy to perform an operation with low torque even in a use in which a stable operation at a low temperature is demanded (for example, an in-vehicle use in which a stable operation is demanded even at a low temperature of −30° C.). Particularly, in a case where the proportion of the mineral oil in 100% by mass of base oil is 30% by mass or less, when the kinematic viscosity v of the base oil at 40° C. is 25 mm²/s or greater, it is easy to reduce the amount of outgas.

Thickener

The thickener has a function of maintaining the grease in a semi-solid shape.

As the thickener, a thickener that is known and is typically used in the grease for a rolling bearing can be used without limitation. Examples of the thickener that is known and is used in the grease for a rolling bearing of the information recording and reproducing apparatus include a urea compound, lithium soap, calcium soap, various kinds of complex soap, silica gel, polytetrafluoroethylene, an organized bentonite, and the like. Among these, as the thickener, the urea compound is preferable in consideration of excellent heat resistance, and a diurea compound having two urea bonds in one molecular is more preferable.

Examples of the diurea compound include an aliphatic diurea compound of which the end is an aliphatic group, an alicyclic diurea compound of which the end is an alicyclic group, an aromatic diurea compound of which the end is an aromatic group, and the like.

Specific examples of the diurea compound include a compound that is obtained through a reaction between diisocyanate (phenylene diisocyanate, tolylene diisocyanate, and the like) and monoamine (octylamine, dodecylamine, stearylamine, aniline, p-toluidine, and the like).

Examples of the lithium soap include lithium stearate, lithium 12-hydroxystearate, and the like.

As the thickener, one kind thereof may be used alone, or two or more kinds thereof may be used in combination.

Other Components

The grease of the invention may contain other components other than the above-described components as necessary.

As the other components, a component that is known and is typically used in the grease can be used, and examples thereof include an additive such as an extreme pressure agent, an antirust agent, an oiliness improver, and a metal deactivator.

Examples of the extreme pressure agent include an organic molybdenum compound (molybdenum dithiocarbamate, molybdenum dithiophosphate, and the like), an organic fatty acid compound (oleic acid, naphthenic acid, succinic acid, and the like), an organic phosphorus compound (trioctyl phosphate, triphenyl phosphate, triethyl phosphate, and the like), phosphorus acid ester, zinc dithiocarbamate, antimony dithiocarbamate, and the like.

As the extreme pressure agent, one kind thereof may be used alone, or two or more kinds thereof may be used in combination.

Examples of the antirust agent include an alkali metal salt or an alkaline-earth metal salt of an organic sulfonic acid (calcium sulfonate, magnesium sulfonate, barium sulfonate, and the like), partial ester of polyhydric alcohol (sorbitan monooleate, and the like), and the like.

As the antirust agent, one kind thereof may be used alone, or two or more kinds thereof may be used in combination.

The grease of the invention may contain an antioxidant other than the component (A) and the component (B). However, it is preferable for the grease not to contain the antioxidant other than the component (A) and the component (B) when considering that it is easy to obtain the effect of the invention.

(Ratio of Each Component)

It is preferable that a proportion of the base oil in 100% by mass of grease of the invention is 75% by mass to 93% by mass, and more preferably 80% by mass to 90% by mass. When the proportion of the base oil is equal to or greater than the lower limit, it is easy to supply the grease or the base oil to the rolling surface of the rolling bearing. When the proportion of the base oil is equal to or less than the upper limit, the grease has a semi-solid shape, and leakage is less likely to occur. Accordingly, scattering is less likely to occur.

It is preferable that the proportion of the mineral oil in 100% by mass of base oil is 10% by mass to 40% by mass, and more preferably 20% by mass to 30% by mass. When the proportion of the mineral oil is equal to or greater than the lower limit, it is easy to obtain grease that is well-balanced between excellent durability and torque smoothness. When the proportion of the mineral oil is equal to or less than the upper limit, it is easy to obtain grease in which the amount of outgas is sufficiently reduced.

It is preferable that a proportion of the PAO in 100% by mass of base oil is 50% by mass to 90% by mass, and more preferably 60% by mass to 80% by mass. When the proportion of the PAO is equal to or greater than the lower limit, it is easy to obtain grease in which the amount of outgas is sufficiently reduced. When the proportion of the PAO is equal to or less than the upper limit, it is easy to obtain grease that is well-balanced between the excellent durability and the torque smoothness.

It is preferable that a proportion of the sum of the mineral oil and the PAO in 100% by mass of base oil is 70% by mass or greater, more preferably 80% by mass or greater, and still more preferably 90% by mass or greater. When the proportion of the sum of the mineral oil and the PAO is equal to or greater than the lower limit, it is easy to obtain low-torque grease. The upper limit of the proportion of the sum of the mineral oil and the PAO is 100% by mass.

In the grease of the invention, it is preferable that the proportion of the PAO is greater than the proportion of the mineral oil in the base oil when considering that the reduction of the amount of outgas and the excellent durability are likely to be compatible with each other.

It is preferable that a mass ratio (PAO/mineral oil) of the PAO to the mineral oil in the base oil is 1.25 to 9, and more preferably 1.5 to 4. When the mass ratio is equal to or greater than the lower limit, it is easy to reduce the amount of outgas. When the mass ratio is equal to or less than the upper limit, it is easy to enhance durability and torque smoothness.

It is preferable that a proportion of the thickener in 100% by mass of grease of the invention is 7% by mass to 20% by mass, and more preferably 10% by mass to 15% by mass.

When the proportion of the thickener is equal to or greater than the lower limit, it is easy to obtain grease in which leakage is less likely to occur, and scattering is less likely to occur. When the proportion of the thickener is equal to or less than the upper limit, it is easy to supply the grease or the base oil to the rolling surface of the rolling bearing.

It is preferable that a proportion of the extreme pressure agent in 100% by mass of grease of the invention is 0.2% by mass to 4% by mass, and more preferably 0.5% by mass to 2% by mass.

It is preferable that a proportion of the antirust agent in 100% by mass of grease of the invention is 0.2% by mass to 4% by mass, and more preferably 0.5% by mass to 2% by mass.

Information Recording and Reproducing Apparatus

The rolling bearing, the rolling bearing device, and the information recording and reproducing apparatus of the invention can employ other aspects which are known in addition to the grease of the invention. Hereinafter, description will be given with reference to an example of the rolling bearing, the rolling bearing device, and the information recording and reproducing apparatus of the invention.

An information recording and reproducing apparatus 1 of this embodiment is an apparatus that performs writing with respect to a disc (magnetic recording medium) D in a vertical recording type, and includes the disc D, a swing arm 2, an optical waveguide 3, a laser light source 4, a head gimbal assembly (HGA) 5, a rolling bearing device 6, an actuator 7, a spindle motor (rotation drive unit) 8, a control unit 9, and a housing 10 as illustrated in FIG. 1.

The housing 10 accommodates respective constituent portions in the information recording and reproducing apparatus 1.

The housing 10 includes the bottom 10a having a rectangular shape in a plan view, a peripheral wall portion (not illustrated) that erects from a peripheral edge of the bottom 10a, and a cover body (not illustrated) that is detachably fixed to an upper portion of the peripheral wall portion and covers an opening. The housing 10 is configured to accommodate respective constituent components on an inner side of the peripheral wall portion on the bottom 10a. In FIG. 1, the peripheral wall portion and the cover body are omitted for convenience.

A material of the housing 10 is not particularly limited, and examples thereof include a metal material such as aluminum.

The spindle motor 8 is attached to approximately the center of the bottom 10a of the housing 10. In addition, the spindle motor 8 is configured to be inserted into a central hole that is formed at the center of the disc D, and three sheets of the disc D are mounted in a detachable manner. The spindle motor 8 is configured to rotate each of the discs D around a rotation axial line L1 in a constant direction.

The actuator 7 is mounted to be positioned on an outer side of the disc D at one corner portion of the bottom 10a of the housing 10. The swing arm 2, which extends toward the disc D, is connected to the actuator 7. The rolling bearing device 6 is provided to a portion on a base end side of the swing arm 2. The swing arm 2 is configured to rotate around a rotation axial line L2 of the rolling bearing device 6 in a horizontal plane by driving of the actuator 7.

The swing arm 2 includes a base portion 2a that is connected to the actuator 7, and an arm portion 2b that extends from the base portion 2a toward the disc D. For example, the swing arm 2 can be obtained by integrally forming the base portion 2a and the arm portion 2b through machining.

The base portion 2a has an approximately rectangular parallelepiped shape, and is rotatably supported to the rolling bearing device 6 so as to surround the rolling bearing device 6.

The arm portion 2b has a plat plate shape, and is configured in a tapered shape that is narrowed as it goes toward a tip end portion from a base end portion. The arm portion 2b is provided to extend from a front surface (surface opposite to a corner portion) 2d of the base portion 2a, which is opposite to a rear surface 2c to which the actuator 7 is attached, in a plane direction (direction in a horizontal plane) of an upper surface of the base portion 2a.

In addition, in the swing arm 2 in this example, three sheets of the arm portions 2b are provided in a height direction (vertical direction) of the base portion 2a in order for the disc D to be interposed between the arm portions 2b, respectively. That is, each of the arm portions 2b and the disc D are arranged to be alternately positioned in the height direction, and the arm portion 2b is configured to move in a direction parallel to a disc surface (surface of the disc D) D1 by driving of the actuator 7.

The head gimbal assembly 5 is provided to the tip end of the arm portion 2b of the swing arm 2. The laser light source 4 is provided to a lateral surface portion of the base portion 2a of the swing arm 2. The optical waveguide 3, which connects the laser light source 4 and the head gimbal assembly 5, is provided to the base portion 2a and the arm portion 2b of the swing arm 2. According to this, it is possible to supply light from the laser light source 4 to the head gimbal assembly 5 through the optical waveguide 3.

The head gimbal assembly 5 includes a suspension 5a, and a slider 5b that is attached to a tip end of the suspension 5a.

The slider 5b includes a near-field light generating element. When light is guided to the slider 5b from the laser light source 4, near-field light is generated from the near-field generating element. It is possible to record or reproduce various kinds of information on or from the disc D by using the near-field light.

For example, the near-field light generating element is constituted by an optical minute opening, a protrusion that is formed in a nanometer size, and the like.

The head gimbal assembly 5 moves in a direction parallel to the disc surface D1 in combination with the arm portion 2b of the swing arm 2 by driving of the actuator 7. In addition, when the rotation of the disc D is stopped, the swing arm 2 and the head gimbal assembly 5 is configured to retreat from the disc D by driving of the actuator 7.

The control unit 9 is connected to the laser light source 4. The control unit 9 is configured to control a luminous flux of light that is supplied to the slider 5b of the head gimbal assembly 5 by a current that is modulated in accordance with information.

Rolling Bearing Device

Figure 2:
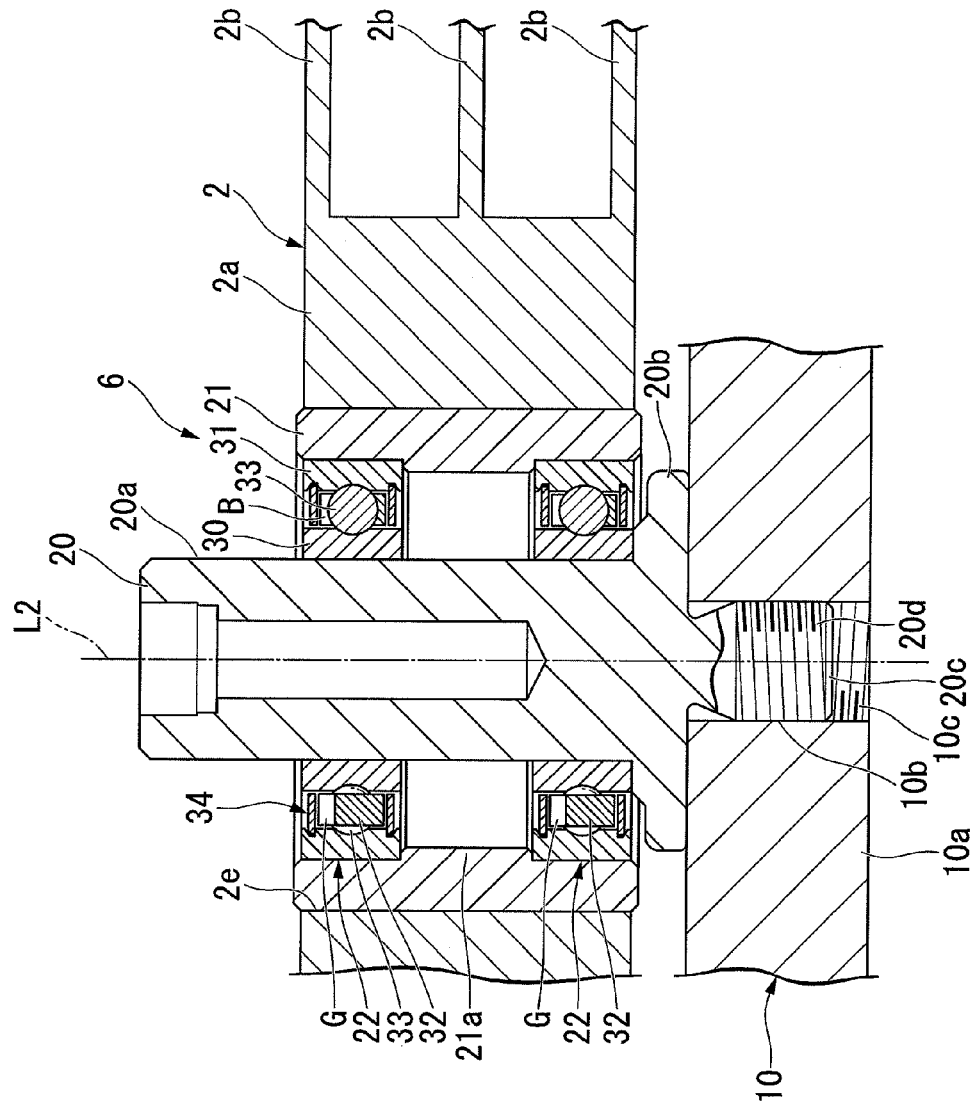
FIG. 2 is a longitudinal cross-sectional view illustrating the periphery of a rolling bearing device in the information recording and reproducing apparatus in FIG. 1.
Figure 3:
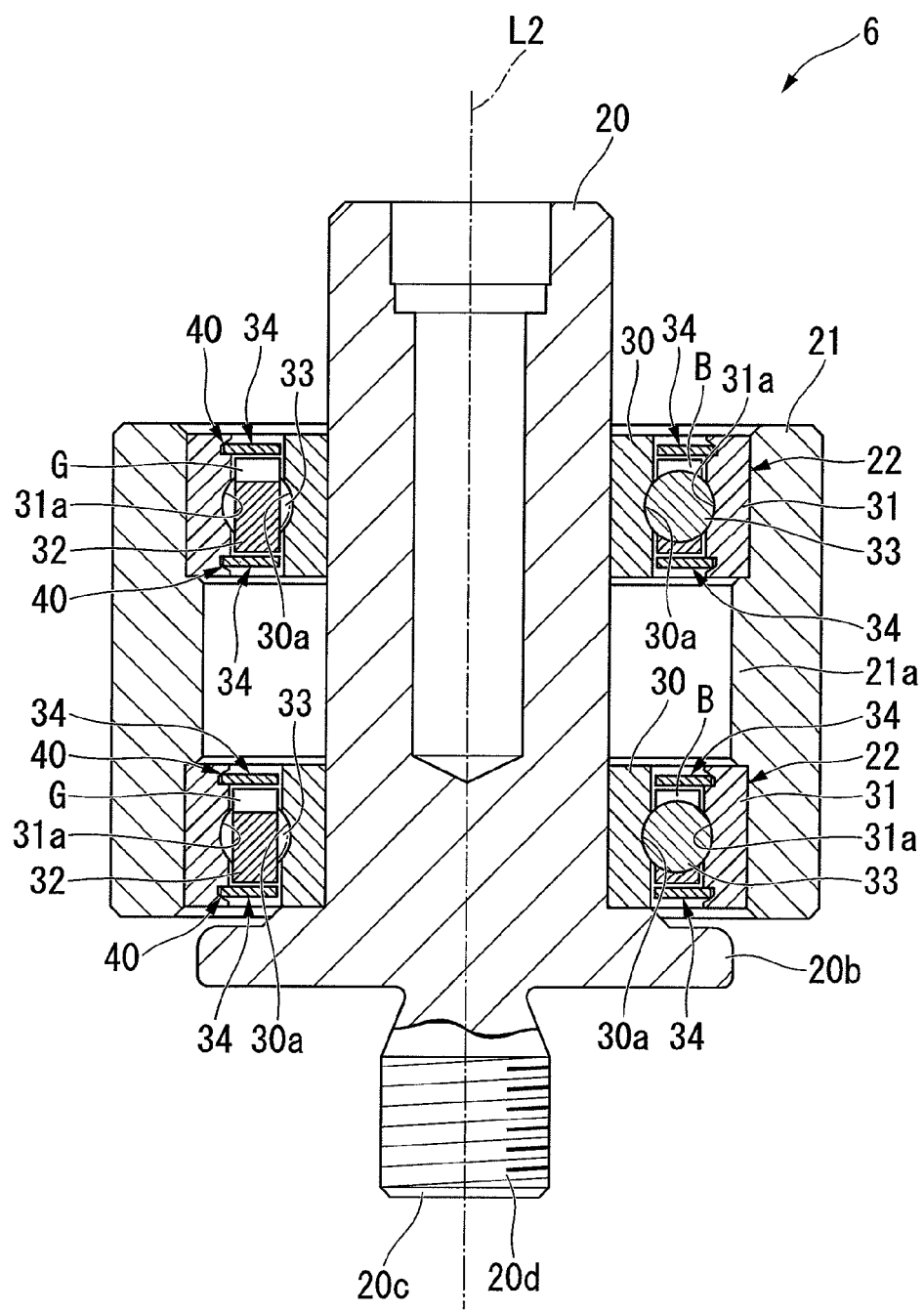
FIG. 3 is a cross-sectional view illustrating the rolling bearing device in FIG. 2.
Figure 4:
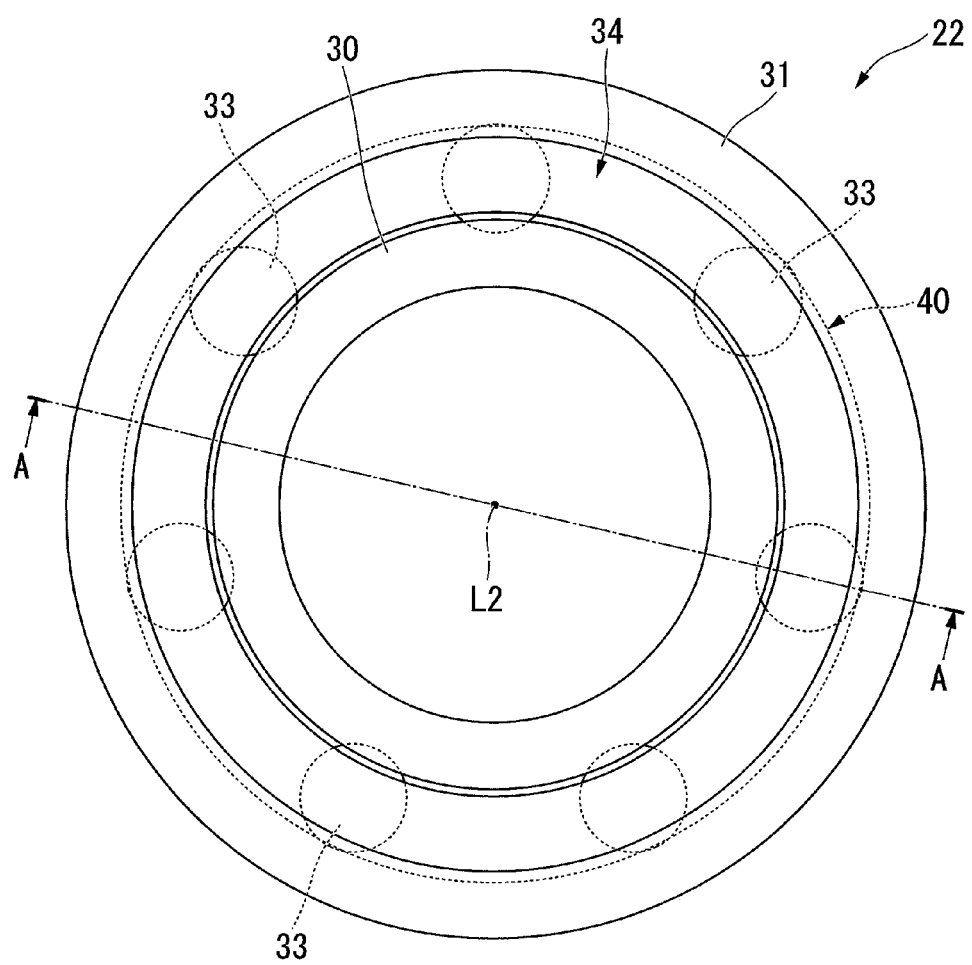
FIG. 4 is a plan view illustrating a rolling bearing in the rolling bearing device in FIG. 3.
Figure 5:
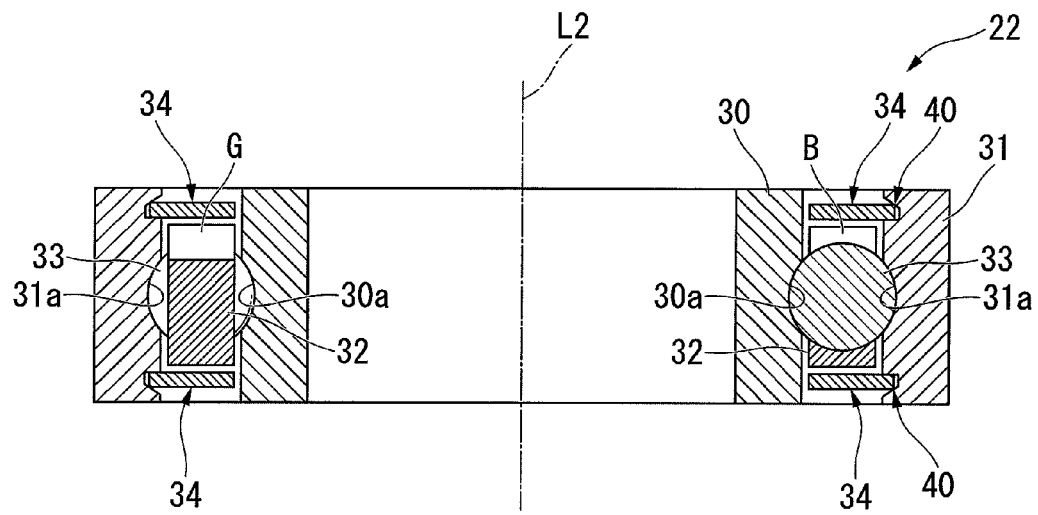
FIG. 5 is a cross-sectional view of the rolling bearing in FIG. 4 which is taken along line A-A.

As illustrated in FIGS. 2 and 3, the rolling bearing device 6 includes a shaft 20, a sleeve 21 that is provided on an outer side of the shaft 20 to be concentric with the shaft 20, and two rolling bearings 22 which are provided between the shaft 20 and the sleeve 21.

The shaft 20 is a rod-shaped member having a columnar shape, and erects from the bottom 10a of the housing 10. A central axis of the shaft 20 becomes the rotation axial line L2 during rotation of the swing arm 2.

At a portion of the shaft 20 on a bottom 10a side of the housing 10, a flange portion 20b having a diameter enlarged from that of a main body portion 20a, and a reduced diameter portion 20c of which a diameter is reduced from that of the main body portion 20a are sequentially provided toward a base end. A male screw 20d is formed on an outer circumferential surface of the reduced diameter portion 20c.

The reduced diameter portion 20c of the shaft 20 is inserted into a hole 10b that is provided in the bottom 10a of the housing 10, and a female screw 10c that is formed on an inner circumferential surface of the hole 10b and the male screw 20d of the reduced diameter portion 20c engage with each other. According to this, the shaft 20 erects from the bottom 10a of the housing 10. At this time, when a lower surface of the flange portion 20b is bonded to the bottom 10a of the housing 10, positioning of the shaft 20 in a height direction is made.

The sleeve 21 is a member that is formed in a cylindrical shape. An inner diameter of the sleeve 21 is approximately the same as an outer diameter of the flange portion 20b.

The sleeve 21 is provided to surround the shaft 20 from an outer side in a diameter direction, and an inner circumferential surface thereof is spaced from an outer circumferential surface of the shaft 20 with a predetermined interval. A central axis of the shaft 20 and a central axis of the sleeve 21 are concentric with each other.

In addition, the sleeve 21 may be pressed into a mounting hole 2e that is formed in the base portion 2a of the swing arm 2 directly or through an elastic body such as a corrugated metal ring, or may be bonding-fitted into the mounting hole 2e. According to this, the sleeve 21 and the swing arm 2 are integrally combined with each other.

A spacer portion 21a, which protrudes toward an inner side over the entire circumference in a circumferential direction, is formed at the central portion of the inner circumferential surface of the sleeve 21 in a height direction. Two rolling bearings 22 are provided between the shaft 20 and the sleeve 21 on an upper side and a lower side of the spacer portion 21a, respectively, and a gap between the two rolling bearings 22 is maintained to a predetermined distance.

Rolling Bearing

The two rolling bearings 22 which are provided to the rolling bearing device 6 are the same as each other.

As illustrated in FIGS. 3 to 6, the rolling bearing 22 includes an inner ring 30, an outer ring 31, a retainer 32, a plurality of rolling bodies 33, and two shield plates 34.

The inner ring 30 is a cylindrical member.

An inner diameter of the inner ring 30 is set to dimensions with which the shaft 20 can be inserted into the inner ring 30. In this embodiment, the inner diameter of the inner ring 30 is set to be slightly greater than an outer diameter of the shaft 20. The shaft 20 is inserted to an inner side of the inner ring 30, and the inner ring 30 is fixed to the shaft 20 with an adhesive and the like.

In addition, the inner diameter of the inner ring 30 may be the same as the outer diameter of the shaft 20 or slightly smaller than the outer diameter as long as the inner diameter is in a range capable of being installed to the shaft 20. In this case, the shaft 20 is pressed into and fixed to the inner ring 30.

In the rolling bearing 22, it is possible to employ a so-called inner ring pre-load type in which the inner ring 30 is fixed to the shaft 20 in a state in which a pre-load is applied to the inner ring 30 relatively to the shaft 20 in an axial direction. According to this, it is possible to make the rolling bearing 22 have high rigidity, and it is possible to raise a resonance frequency (resonance point) of the rolling bearing device 6. As a result, the rolling bearing device 6 can cope with a relatively high-speed rotation.

In addition, in the rolling bearing 22, it is also possible to employ a so-called outer ring pre-load type in which the outer ring 31 is fixed to the sleeve 21 in a state in which a pre-load is applied to the outer ring 31 relatively to the shaft 20 in an axial direction.

At an intermediate portion of the outer circumferential surface of the inner ring 30 in the axial direction, an inner ring rolling surface 30a, which is a recessed strip that guides rolling of the rolling bodies 33, is formed over the entire circumference of the inner ring 30. In the inner ring rolling surface 30a, when cutting the inner ring 30 along a plane passing through the central axis of the inner ring 30, a cross-sectional shape is an arc shape.

Examples of a material of the inner ring 30 include a metal material such as stainless steel. For example, the inner ring 30 can be manufactured by forging, machining, and the like.

The outer ring 31 is member that has a diameter greater than that of the inner ring 30, and has the same cylindrical shape as that of the inner ring 30.

The outer ring 31 is fixed to an inner side of the sleeve 21, and is provided on an outer side of the inner ring 30 in a state of being spaced from the inner ring 30. The inner ring 30 and the outer ring 31 are provided to be concentric with each other so that central axes thereof match the central axis of the shaft 20.

At an intermediate portion of the inner circumferential surface of the outer ring 31 in the axial direction, an outer ring rolling surface 31a, which is a recessed strip that guides rolling of the rolling bodies 33, is formed over the entire circumference of the outer ring 31 to face the inner ring rolling surface 30a of the inner ring 30. In the outer ring rolling surface 31a, when cutting the outer ring 31 along a plane passing through the central axis of the outer ring 31, a cross-sectional shape is an arc shape.

Examples of a material of the outer ring 31 include a metal material such as stainless steel. For example, the inner ring 30 can be manufactured by forging, machining, and the like.

Figure 6:
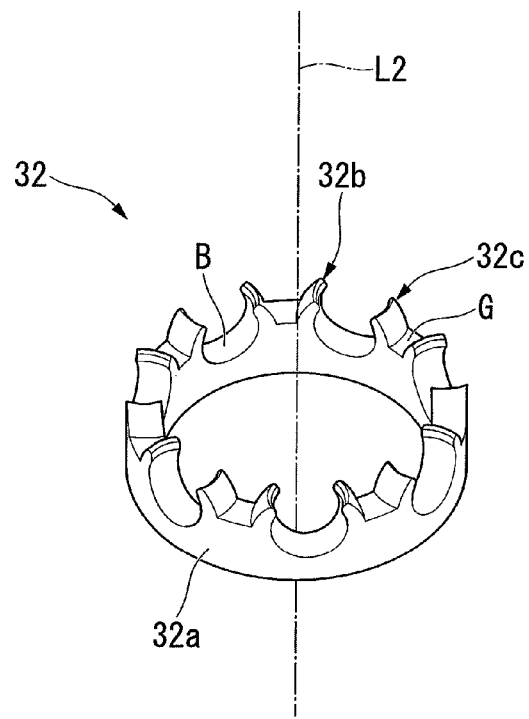
FIG. 6 is a perspective view illustrating a retainer of the rolling bearing in FIG. 5.

As illustrated in FIG. 6, the retainer 32 includes an annular main body portion 32a, and seven pairs of hook portions 32b and 32c which are formed on an upper portion of the main body portion 32a and erect in an arc shape in such a manner that a distance therebetween becomes narrow as it goes toward a tip end. The seven pairs of hook portions 32b and 32c are provided at even intervals in a circumferential direction of the retainer 32. A ball pocket B, which retains each of the rolling bodies 33 in a rolling manner and has an approximately circular shape when viewed from a front side, is formed on an inner side of each pair of the hook portion 32b and the hook portion 32c.

In addition, the number of the pairs of the hook portions, that is, the number of the ball pocket B is not limited to 7, and may be 6 or less, or 8 or greater.

An inner diameter of the retainer 32 is set to be larger than an outer diameter of the inner ring 30, and an outer diameter of the retainer 32 is set to be smaller than an inner diameter of the outer ring 31. In a state in which the retainer 32 is provided between the inner ring 30 and the outer ring 31, the rolling body 33 is retained in each ball pocket B in a rolling manner. As described above, in a state in which the inner ring 30, the outer ring 31, and the retainer 32 do not interfere each other, the rolling body 33 is disposed between the inner ring rolling surface 30a of the inner ring 30 and the outer ring rolling surface 31a of the outer ring 31.

The retainer 32 is configured to rotate around the central axis L2 in a state in which the rolling body 33 is retained in each ball pocket B in a rolling manner.

Although not particularly limited, examples of a material of the retainer 32 include a resin such as a polyamide resin.

A grease pocket G, which has a depth shallower than that of the ball pocket B, is formed between a pair of the hook portions 32b and 32c, and an adjacent pair of the hook portions 32b and 32c on an upper side of the retainer 32. That is, in the retainer 32, the ball pocket B and the grease pocket G are alternately formed in a circumferential direction due to the plurality of pairs of hook portions 32b and 32c.

When the retainer 32 and the rolling body 33 rotate in a state in which the grease of the invention is disposed in the grease pocket and the rolling body 33 is disposed in the ball pocket B, the grease bleeds out from the grease pocket G to a space between the inner ring 30, the outer ring 31, and the rolling body 33, and a lubricating effect to the grease is obtained.

When the grease is used in the rolling bearing 22 by using the grease pocket G, it is possible to reduce the amount of the grease that is used. According to this, it is easy to suppress an increase in torque on the rolling bearing 22 due to an excessive amount of the grease, and it is easy to obtain sufficient cleanness that is demanded for writing and reading to and from the disc D.

In this example, the rolling body 33 has a spherical shape. The rolling body 33 is disposed in the ball pocket B of the retainer 32 between the inner ring rolling surface 30a of the inner ring 30 and the outer ring rolling surface 31a of the outer ring 31, and rolls along the inner ring rolling surface 30a and the outer ring rolling surface 31a. Respective rolling bodies 33 are equally arranged in the circumferential direction due to the retainer 32.

In this example, the number of the rolling bodies 33 is 7. However, the number of the rolling bodies 33 may be determined in accordance with the number of the ball pockets B in the retainer 32, and may be 6 or less or 8 or greater.

Examples of a material of the rolling body 33 include a metal material such as bearing steel.

The shied plates 34 are ring-shaped plate members which cover an upper side and a lower side of an annular space that is formed between the inner ring 30 and the outer ring 31. The shield plates 34 are provided on an upper side and a lower side of the retainer 32 and the plurality of rolling bodies 33, respectively, between the inner ring 30 and the outer ring 31. Each of the shield plates 34 is fixed to the outer ring 31 in a state in which an outer peripheral portion enters a circular groove 40 for engaging which is formed in the outer ring 31.

Operation Mechanism

In the information recording and reproducing apparatus 1, the grease of the invention is disposed in the grease pocket G of the retainer 32 in the rolling bearing 22. When the swing arm 2 rotates by driving of the actuator 7, the grease, which is disposed in the grease pocket G, passes through a lateral surface of the inner ring 30, the outer ring 31, and the retainer 32, and is supplied to a space between the inner ring 30, the outer ring 31, and the rolling bodies 33. According to this, the lubricating effect of the grease is exhibited.

In the information recording and reproducing apparatus 1, since the grease of the invention is used, the amount of outgas is sufficiently reduced. According to this, outgas is less likely to be collected in a gap between the head gimbal assembly and the disc D. As a result, it is possible to stably perform reading and writing. In addition, it is possible to secure excellent durability, and it is possible to maintain a state in which torque smoothness is excellent with low torque over a long period of time.

Other Embodiments

The rolling bearing, the rolling bearing device, and the information recording and reproducing apparatus of the invention are not limited to the above-described configurations as long as the grease of the invention is used.

For example, the information recording and reproducing apparatus 1 including the rolling bearing 22 and the rolling bearing device 6 uses near-field light, but may be a typical HDD or optical disc D device including a rolling bearing and a rolling bearing device which use the grease of the invention, and the like.

In addition, the use of the grease of the invention is not limited to the information recording and reproducing apparatus, and can also be applied to, for example, an apparatus of manufacturing an electronic apparatus in which a reduction in dust generation or outgas from the grease is demanded. Examples of the apparatus of manufacturing the electronic apparatus include an apparatus of manufacturing a semiconductor, an apparatus of manufacturing a liquid crystal, an apparatus of manufacturing a printed substrate, and the like.

In addition, in addition to the use in the rolling bearing, the grease of the invention can be used, for example, as grease that is sealed in a linear guide, and a ball screw.

In addition, the rolling bearing device may not include the sleeve. Specifically, it is possible to employ a rolling bearing device that includes a ring-shaped spacer ring, which maintains a gap between the rolling bearings to a predetermined distance, between the two rolling bearings which are disposed to be spaced away from each other in an axial direction on an outer side of the shaft, and does not include the sleeve. In this case, it is possible to employ an aspect in which the outer ring of the rolling bearing is directly pressed into or bonding-fitted into the mounting hole that is formed in the base portion of the swing arm.

In addition, the rolling bodies in the rolling bearing may be cylindrical rollers.

EXAMPLES

Hereinafter, the invention will be described in detail with reference to Examples, but the invention is not limited by the following description.

Raw materials which were used in Examples are as follows.

The kinematic viscosity of the mineral oil, the PAO, and the base oil in Examples was measured at 40° C. in conformity to JIS K 2283 by using a Cannon-Fenske viscometer.

Component (A)

A-1: di(4-octylphenyl)amine.

Component (B)

B-1: benzene propanoic acid, and 3,5-bis(1,1-dimethylethyl)-4-hydroxy C7-C9 side chain alkyl ester.

B-2: Pentaerythritol tetrakis[3-(3,5-di-t-butyl-4-hydroxyphenyl)propionate].

Component (A') which is a comparative component of Component (A)

A'-1: bis(1,2,2,6,6-pentamethyl-4-piperidyl)sebacate.

Component (B') which is a comparative component of Component (B)

B'-1: 2,6-di-tert-butyl-p-cresol.

Measurement of Amount of Outgas

Measurement of the amount of outgas was performed with respect to the following respective Samples. Results are illustrated in Table 1.

Measurement Sample

Reference Sample: Refined mineral oil (classified as Group III in the API base oil category). A kinematic viscosity $v_1$=47 mm$^2$/s)

Sample 1: Sample obtained by adding 0.2% by mass of A-1 (on the basis of the total mass) to the reference sample.

Sample 2: Sample obtained by adding 0.2% by mass of B-1 (on the basis of the total mass) to the reference sample.

Sample 3: Sample obtained by adding 0.2% by mass of B-2 (on the basis of the total mass) to the reference sample.

Sample 4: Sample obtained by adding 0.1% by mass of A'-1 and 0.1% by mass of zinc diamyldithiocarbamate (Zn-DTC) (on the basis of the total mass, respectively) to the reference sample.

Sample 5: Sample obtained by adding 0.2% by mass of B'-1 (on the basis of the total mass) to the reference sample.

(Method of Measuring Amount of Outgas)

Each sample (4.5 mg to 5.5 mg) was uniformly applied onto aluminum foil of 15 mm square by using a glass rod, and was set as a measurement sample. The measurement sample was heated at 85° C. for 3 hours in an oven in combination with 5 µL (100 ng) of standard reagent (hexadecane), and a gas that was generated was adsorbed to a collection tube. Subsequently, the collection tube was mounted on a heating and desorption device (TD-100) and was heated at 320° C., and a gas, which was generated from the collection tube, was transmitted to a gas chromatography mass spectrometer (GC-MS). In the GC-MS, chromatogram data was obtained by a temperature profile in which retention was performed at 40° C. for 2 minutes, a temperature was raised to 280° C. for 20 minutes at a rate of 12° C./minute, and retention was performed at 280° C. for 20 minutes, and then component identification was performed by a library inside the GC-MS. The amount of outgas was calculated in terms of the standard reagent on the basis of a chromatogram peak (corresponding to 100 ng) of the standard reagent (hexadecane).

that contains the component (B'), the amount of outgas further increased in comparison to the reference sample.

That is, from results of Table 1, it could be confirmed that the amount of outgas can be reduced by adding the component (A) or the component (B) to the base oil.

Examples 1 to 2

Each grease of Examples 1 and 2 was prepared as follows. In addition, with respect to the grease obtained in each of Examples 1 and 2, measurement of the amount of outgas, an oxidation stability test, a durability test, and a grease bump test were performed as follows. Results are illustrated in Table 2.

Example 1

A refined mineral oil (classified as Group III in the API base oil category, the flash point: 250° C. or higher, the kinematic viscosity $v_1$: 47 mm$^2$/s), and PAO (MIX; mixture of trimers to pentamers of α-olefin having 8, 10, or 12 carbon atoms as a raw material) (the kinematic viscosity $v_2$=30 mm$^2$/s) were mixed in a mass ratio of 3:7, and the resultant mixture was set as a base oil (the kinematic viscosity $v$=34 mm$^2$/s).

Subsequently, grease was formed by using the base oil and an alicyclic diurea compound (thickener), and then A-1, B-1, and an antirust agent were added to the grease. The resultant mixture was mixed to prepare grease of Example 1. As proportions of respective components in 100% by mass of grease, the base oil was set to 85.8% by mass, the thickener was set to 12.5% by mass, A-1 was set to 0.5% by mass, B-1 was set to 0.2% by mass, and the antirust agent was set to 1.0% by mass.

Example 2

Grease of Example 2 was prepared in the same manner of Example 1 except that the extreme pressure agent was added and mixed in addition to A-1, B-1, and the antirust agent. As

TABLE 1

| | | Reference sample | Sample 1 | Sample 2 | Sample 3 | Sample 4 | Sample 5 |
|---|---|---|---|---|---|---|---|
| Kind of antioxidant | | — | A-1 | B-1 | B-2 | A'-1 Zn-DTC | B'-1 |
| Amount of outgas [ng/pcs] | Total amount | 633 | 221 | 324 | 285 | 713 | 9307 |
| | Aliphatic hydrocarbon | 454 | 78 | 114 | 85 | 416 | 100 |
| | Aromatic hydrocarbon | 59 | 19 | 15 | 22 | 27 | 14 |
| | Amine-based | 0 | 6 | 9 | 0 | 28 | 0 |
| | Phenol-based | 56 | 53 | 65 | 86 | 51 | 8954 |
| | Alcohol-based | 0 | 13 | 20 | 10 | 10 | 14 |
| | Aldehyde-based | 0 | 16 | 27 | 20 | 0 | 19 |
| | Ether-based | 0 | 3 | 0 | 0 | 0 | 0 |
| | Ketone-based | 52 | 0 | 4 | 3 | 3 | 163 |
| | Ester-based | 0 | 1 | 24 | 7 | 77 | 10 |
| | Benzotriazole | 0 | 0 | 0 | 0 | 0 | 0 |
| | Indistinct component | 12 | 32 | 46 | 52 | 101 | 33 |

As illustrated in Table 1, in Samples 1 to 3, which contains the component (A) or the component (B), the amount of outgas was further reduced in comparison to the reference sample. On the other hand, in Sample 4 that contains the component (A'), the amount of outgas was approximately the same as that of the reference sample, and in Sample 5 proportions of respective components in 100% by mass of grease, the base oil was set to 84.8% by mass, the thickener was set to 12.5% by mass, A-1 was set to 0.5% by mass, B-1 was set to 0.2% by mass, the antirust agent was set to 1.0% by mass, and the extreme pressure agent was set to 1.0% by mass.

Reference Example 1

With respect to commercially available grease α for the rolling bearing of the information recording and reproducing apparatus, the measurement of the amount of outgas, the oxidation stability test, the durability test, and the grease bump test were performed as follows. Results are illustrated in Table 2. In addition, the grease α contains a urea compound as the thickener.

Measurement of Amount of Outgas

The amount of outgas of each grease was measured in the same manner (the method of measuring the amount of outgas) as described above except that samples obtained by uniformly applying each grease (4.5 mg to 5.5 mg) of Examples 1 to 2, and Reference Example 1 onto aluminum foil of 15 mm square by using a glass rod.

Oxidation Stability Test

In conformity to JIS K 2220, a sample, which was pressurized at 755 kPa in an oxygen cylinder, was heated at 99° C., and a pressure drop after the passage of 100 hours was measured.

The test was performed to mainly evaluate the oxidation stability in a case of using the grease for a long period of time, and it can be said that the smaller a measurement value is, the more excellent the oxidation stability is.

Durability Test

The rolling bearing device 6 illustrated in FIGS. 3 to 6 was prepared. Then, the grease in each example was disposed in the grease pocket G of the retainer 32, and a continuous operation was performed under the following operation conditions to measure a torque variation width (hashing) as a torque ratio of torque after the continuous operation to initial torque before the continuous operation.

Operation Conditions
Operation frequency: 30 Hz
Operation angle: 10 deg
Operation time: 100 hours
Operation environmental temperature: 80° C.

Grease Bump Test

The rolling bearing device 6 illustrated in FIGS. 3 to 6 was prepared. Then, grease of each example was disposed in the grease pocket G of the retainer 32, and a continuous operation was performed under the following operation conditions to measure torque immediately after the continuous operation. The, evaluation was performed in accordance with the following standards.

Operation Conditions
Operation frequency: 15 Hz
Operation angle: 5 deg
Operation time: 50 hours
Operation environmental temperature: Room temperature Evaluation Standards O: Torque immediately after the continuous operation hardly varies from the initial torque before the continuous operation.

×: Torque immediately after the continuous operation greatly varies from the initial torque before the continuous operation.

TABLE 2

| | | Example 1 | Example 2 | Reference Example 1 Grease α |
|---|---|---|---|---|
| Amount of outgas | Total amount | 868 | 917 | 7321 |
| | Aliphatic hydrocarbon | 284 | 272 | 3671 |
| [ng/pcs] | Aromatic hydrocarbon | 40 | 39 | 175 |
| | Amine-based | 5 | 4 | 1159 |
| | Phenol-based | 309 | 404 | 126 |
| | Alcohol-based | 32 | 20 | 113 |
| | Aldehyde-based | 14 | 29 | 0 |
| | Ether-based | 0 | 0 | 0 |
| | Ketone-based | 10 | 22 | 357 |
| | Ester-based | 46 | 34 | 489 |
| | Benzotriazole | 79 | 50 | 0 |
| | Indistinct component | 49 | 43 | 1231 |
| Oxidation stability (kPa) | | 5 | 5 | 15 |
| Durability test (torque variation width) [times] | | 1.8 | 1.6 | 5 |
| Grease bump test | | ○ | ○ | ×(6 times) |

As illustrated in Table 2, in the grease of Examples 1 and 2 which contained the component (A) and the component (B), the amount of outgas was small, and the oxidation stability was excellent. In addition, in Examples 1 and 2, a variation in torque was smaller in any of the durability test and the grease bump test, and excellent durability was exhibited.

On the other hand, in the commercially available grease α for the rolling bearing of the information recording and reproducing apparatus, the amount of outgas was not sufficiently reduced, and the oxidation stability was not sufficient. In addition, in the grease α, a torque variation width in the durability test was large, and the durability thereof was inferior to that of Examples 1 and 2. In addition, in the grease bump test, the torque after the continuous operation increased to approximately 6 times the torque before the continuous operation. The main cause for this is considered as follows. The grease, which is oxidatively degraded, collects to an edge portion in an operation range to form a bump in the continuous operation, or abrasion is extensive at the edge portion of the operation range during the continuous operation.

In addition, oxidative degradation tendency of the grease of Example 2 and the commercially available grease α when being maintained at 130° C. was observed with FT-IR. As a result, the oxidative degradation tendency was confirmed in the grease α after the passage of 1000 hours. In contrast, the oxidative degradation tendency was not confirmed in the grease of Example 2 even after the passage of 2000 hours.

<Samples 6 to 41>

An evaluation oil containing the base oil and the antioxidant illustrated in Table 3 was prepared. The antioxidant was added in the amount of 0.2% by mass on the basis of the total mass of the base oil and the antioxidant. In a case of using two kinds of the antioxidants in combination, the antioxidants were added in a total amount of 0.2% by mass.

A refined mineral oil GrIII and PAO (MIX) in Table 3 are the same as those used in Example 1.

A "refined mineral oil GrIII+PAO (MIX)" in Table 3 was obtained by mixing the mineral oil and the PAO in a mass ratio of 3:7, and is the same as the base oil in Example 1.

ADE in Table 3 is alkyldiphenyl ether, and the kinematic viscosity $v_2$ is 100 mm²/s (40° C.).

PE in Table 3 is pentaerythritol, and the kinematic viscosity $v_2$ is 120 mm²/s (40° C.).

PAO (decene) in Table 3 is a mixture of trimers to pentamers of α-olefin having 10 carbon atoms as a raw material (the kinematic viscosity $v_2$ is 30 mm²/s (40° C.)).

A-1 and B-1 in Table 3 is the same as the antioxidant used in Example 1. "(A-1)+(B-1)" is a mixture of two antioxidants, and a mixing ratio thereof is 1:1 on the mass basis.

A'-1 and B'-1 in Table 3 are the same as those used in Samples 4 and 5.

In columns of Table 3, P1-A to P6-A, P1-E to P6-E, and P1-F to P6-F are samples (Comparative Products) which contain an antioxidant of a comparative component and correspond to Comparative Examples.

In columns of Table 3, P1-B to P6-B, P1-C to P6-C, and P1-D to P6-D are samples (Present Products) which contain a specific antioxidant included in the invention and correspond to Examples.

TABLE 3

| Base oil | Antioxidant | | | | | |
|---|---|---|---|---|---|---|
| | Not added | A-1 | B-1 | (A-1) + (B-1) | A'-1 Zn-DTC | B'-1 |
| Refined mineral oil GrIII | P1-A | P1-B | P1-C | P1-D | P1-E | P1-F |
| PAO(MIX) | P2-A | P2-B | P2-C | P2-D | P2-E | P2-F |
| Refined mineral oil GrIII + PAO(MIX) | P3-A | P3-B | P3-C | P3-D | P3-E | P3-F |
| ADE | P4-A | P4-B | P4-C | P4-D | P4-E | P4-F |
| PE | P5-A | P5-B | P5-C | P5-D | P5-E | P5-F |
| PAO(decene) | P6-A | P6-B | P6-C | P6-D | P6-E | P6-F |
| | Comparative product | Present product | | | Comparative product | |

The amount of outgas was measured in the same manner as Samples 1 to 5. Results are illustrated in Tables 4 to 9.

TABLE 4

Amount of Outgas in Sample Using Refined Mineral Oil GrIII as Base Oil

| | | Comparative Product | Present Product | | | Comparative product | |
|---|---|---|---|---|---|---|---|
| | Sample | P1-A | P1-B | P1-C | P1-D | P1-E | P1-F |
| Amount of outgas [ng/pcs] | Total amount | 633 | 221 | 324 | 278 | 713 | 9307 |
| | Aliphatic hydrocarbon | 454 | 78 | 114 | 95 | 416 | 100 |
| | Aromatic hydrocarbon | 59 | 19 | 15 | 18 | 27 | 14 |
| | Amine-based | 0 | 6 | 9 | 8 | 28 | 0 |
| | Phenol-based | 56 | 53 | 65 | 60 | 51 | 8954 |
| | Alcohol-based | 0 | 13 | 20 | 16 | 10 | 14 |
| | Aldehyde-based | 0 | 16 | 27 | 22 | 0 | 19 |
| | Ether-based | 0 | 3 | 0 | 0 | 0 | 0 |
| | Ketone-based | 52 | 0 | 4 | 2 | 3 | 163 |
| | Ester-based | 0 | 1 | 24 | 17 | 77 | 10 |
| | Benzotriazole | 0 | 0 | 0 | 0 | 0 | 0 |
| | Indistinct component | 12 | 32 | 46 | 40 | 101 | 33 |

TABLE 5

Amount of Outgas in Sample Using PAO (MIX) as Base Oil

| | | Comparative product | Present product | | | Comparative product | |
|---|---|---|---|---|---|---|---|
| | Sample | P2-A | P2-B | P2-C | P2-D | P2-E | P2-F |
| Amount of outgas [ng/pcs] | Total amount | 351 | 225 | 297 | 257 | 3309 | 8370 |
| | Aliphatic hydrocarbon | 43 | 39 | 34 | 31 | 113 | 4 |
| | Aromatic hydrocarbon | 9 | 8 | 9 | 9 | 82 | 2 |
| | Amine-based | 0 | 0 | 0 | 0 | 0 | 0 |
| | Phenol-based | 84 | 53 | 61 | 64 | 749 | 8307 |
| | Alcohol-based | 0 | 7 | 10 | 11 | 0 | 3 |
| | Aldehyde-based | 18 | 2 | 6 | 12 | 124 | 2 |
| | Ether-based | 0 | 0 | 0 | 0 | 0 | 0 |
| | Ketone-based | 0 | 0 | 2 | 4 | 7 | 25 |
| | Ester-based | 4 | 3 | 44 | 16 | 1181 | 1 |
| | Benzotriazole | 0 | 0 | 0 | 0 | 0 | 0 |
| | Indistinct component | 191 | 112 | 128 | 110 | 969 | 26 |

TABLE 6

Amount of Outgas in Sample Using Refined Mineral Oil GrIII + PAO (MIX) as Base Oil

|  |  | Comparative product | Present product | | | Comparative product | |
|---|---|---|---|---|---|---|---|
|  | Sample | P3-A | P3-B | P3-C | P3-D | P3-E | P3-F |
| Amount of outgas [ng/pcs] | Total amount | 544 | 274 | 297 | 317 | 2582 | 15222 |
|  | Aliphatic hydrocarbon | 163 | 56 | 77 | 99 | 501 | 68 |
|  | Aromatic hydrocarbon | 17 | 10 | 5 | 7 | 53 | 6 |
|  | Amine-based | 0 | 0 | 0 | 0 | 0 | 0 |
|  | Phenol-based | 106 | 70 | 51 | 55 | 311 | 14986 |
|  | Alcohol-based | 0 | 0 | 0 | 9 | 0 | 8 |
|  | Aldehyde-based | 10 | 30 | 14 | 11 | 102 | 9 |
|  | Ether-based | 0 | 0 | 0 | 0 | 0 | 0 |
|  | Ketone-based | 1 | 8 | 3 | 4 | 0 | 56 |
|  | Ester-based | 8 | 3 | 18 | 25 | 953 | 3 |
|  | Benzotriazole | 0 | 0 | 0 | 0 | 0 | 0 |
|  | Indistinct component | 239 | 97 | 129 | 107 | 662 | 86 |

TABLE 7

Amount of Outgas in Sample Using ADE as Base Oil

|  |  | Comparative product | Present product | | | Comparative product | |
|---|---|---|---|---|---|---|---|
|  | Sample | P4-A | P4-B | P4-C | P4-D | P4-E | P4-F |
| Amount of outgas [ng/pcs] | Total amount | 322 | 205 | 189 | 222 | 4669 | 11791 |
|  | Aliphatic hydrocarbon | 21 | 14 | 39 | 59 | 725 | 35 |
|  | Aromatic hydrocarbon | 10 | 11 | 7 | 5 | 128 | 5 |
|  | Amine-based | 0 | 0 | 0 | 0 | 0 | 0 |
|  | Phenol-based | 145 | 94 | 48 | 45 | 502 | 11596 |
|  | Alcohol-based | 9 | 0 | 0 | 0 | 0 | 0 |
|  | Aldehyde-based | 18 | 24 | 21 | 16 | 291 | 11 |
|  | Ether-based | 0 | 0 | 0 | 0 | 0 | 0 |
|  | Ketone-based | 12 | 9 | 5 | 5 | 285 | 88 |
|  | Ester-based | 12 | 3 | 2 | 16 | 1876 | 2 |
|  | Benzotriazole | 0 | 0 | 0 | 0 | 0 | 0 |
|  | Indistinct component | 95 | 50 | 67 | 76 | 862 | 54 |

TABLE 8

Amount of Outgas in Sample Using PE as Base Oil

|  |  | Comparative product | Present product | | | Comparative product | |
|---|---|---|---|---|---|---|---|
|  | Sample | P5-A | P5-B | P5-C | P5-D | P5-E | P5-F |
| Amount of outgas [ng/pcs] | Total amount | 746 | 520 | 603 | 588 | 4660 | 12187 |
|  | Aliphatic hydrocarbon | 140 | 69 | 88 | 88 | 1062 | 122 |
|  | Aromatic hydrocarbon | 10 | 11 | 10 | 62 | 41 | 7 |
|  | Amine-based | 0 | 0 | 0 | 0 | 0 | 0 |
|  | Phenol-based | 62 | 61 | 62 | 0 | 545 | 11742 |
|  | Alcohol-based | 16 | 11 | 12 | 6 | 98 | 0 |
|  | Aldehyde-based | 5 | 25 | 41 | 21 | 162 | 5 |
|  | Ether-based | 0 | 0 | 0 | 0 | 0 | 0 |
|  | Ketone-based | 0 | 18 | 30 | 66 | 0 | 110 |

TABLE 8-continued

Amount of Outgas in Sample Using PE as Base Oil

| Sample | Comparative product P5-A | Present product P5-B | P5-C | P5-D | Comparative product P5-E | P5-F |
|---|---|---|---|---|---|---|
| Ester-based | 57 | 51 | 85 | 17 | 780 | 30 |
| Benzotriazole | 0 | 0 | 0 | 0 | 0 | 0 |
| Indistinct component | 456 | 274 | 275 | 328 | 1972 | 171 |

TABLE 9

Amount of Outgas in Sample Using PAO (decene) as Base Oil

| | Sample | Comparative product P6-A | Present product P6-B | P6-C | P6-D | Comparative product P6-E | P6-F |
|---|---|---|---|---|---|---|---|
| Amount of outgas [ng/pcs] | Total amount | 1544 | 1013 | 1248 | 1430 | 2377 | 8576 |
| | Aliphatic hydrocarbon | 975 | 345 | 318 | 894 | 1221 | 45 |
| | Aromatic hydrocarbon | 8 | 9 | 12 | 5 | 16 | 4 |
| | Amine-based | 0 | 16 | 4 | 4 | 0 | 0 |
| | Phenol-based | 89 | 383 | 457 | 96 | 253 | 8151 |
| | Alcohol-based | 0 | 3 | 2 | 2 | 0 | 7 |
| | Aldehyde-based | 5 | 26 | 38 | 35 | 106 | 10 |
| | Ether-based | 0 | 0 | 0 | 0 | 0 | 0 |
| | Ketone-based | 1 | 3 | 22 | 5 | 19 | 138 |
| | Ester-based | 7 | 9 | 58 | 74 | 193 | 28 |
| | Benzotriazole | 0 | 0 | 0 | 0 | 0 | 0 |
| | Indistinct component | 454 | 216 | 333 | 311 | 566 | 189 |

Confirmation of Oxidative Degradation 5 g of each sample illustrated in Table 3 was put into a beaker (a cylindrical container having outer diameter× height: 30 mm×40 mm), and the beaker was settled in a thermostatic bath maintained at 100° C. After the passage of 240 hours, the sample in each beaker was measured with FT-IR for every 24 hours to confirm whether or not the oxidative degradation occurred. Elapsed time (unit: hour (h)), at which the oxidative degradation was confirmed for the first time, is illustrated in parentheses under a sample name in Table 10. In addition, with respect to a sample, which was not subjected to the measurement, "-" is written in parentheses.

TABLE 10

| | | | Antioxidant | | | |
|---|---|---|---|---|---|---|
| Base oil | Not added | A-1 | B-1 | (A-1) + (B-1) | A'-1 Zn-DTC | B'-1 |
| Refined mineral oil GrIII | Pl-A (384) | Pl-B (1296) | Pl-C (—) | Pl-D (—) | P1-E (—) | Pl-F (624) |
| PAO(MIX) | P2-A (1848) | P2-B (2064) | P2-C (—) | P2-D (—) | P2-E (—) | P2-F (—) |
| Refined mineral oil GrIII + PAO(MIX) | P3-A (1560) | P3-B (—) | P3-C (—) | P3-D (—) | P3-E (—) | P3-F (—) |
| ADE | P4-A (—) | P4-B (—) | P4-C (—) | P4-D (—) | P4-E (—) | P4-F (—) |
| PE | P5-A (792) | P5-B (—) | P5-C (—) | P5-D (—) | P5-E (—) | P5-F (—) |
| PAO(decene) | P6-A (288) | P6-B (1560) | P6-C (—) | P6-D (—) | P6-E (—) | P6-F (384) |
| | Comparative product | | Present product | | Comparative product | |

Measurement of Evaporation Loss 5 g of grease of each of Example 2 and Reference Example 1 was put into a schale having an outer diameter of 41 mm (inner diameter of 37 mm), and a height of 8 mm (accommodation height: 5 mm), and was settled in thermostatic baths, which were set to respective temperatures of 85° C., 100° C., and 130° C. in a state in which a surface was made to be smoothly flat. Then, each schale was taken out from each of the thermostatic baths for each constant time to measure the mass of the grease, thereby calculating the evaporation loss (% by mass) from a variation amount. In addition, the measurement was stopped at a stage in which the oxidative degradation was determined.

Figure 7:
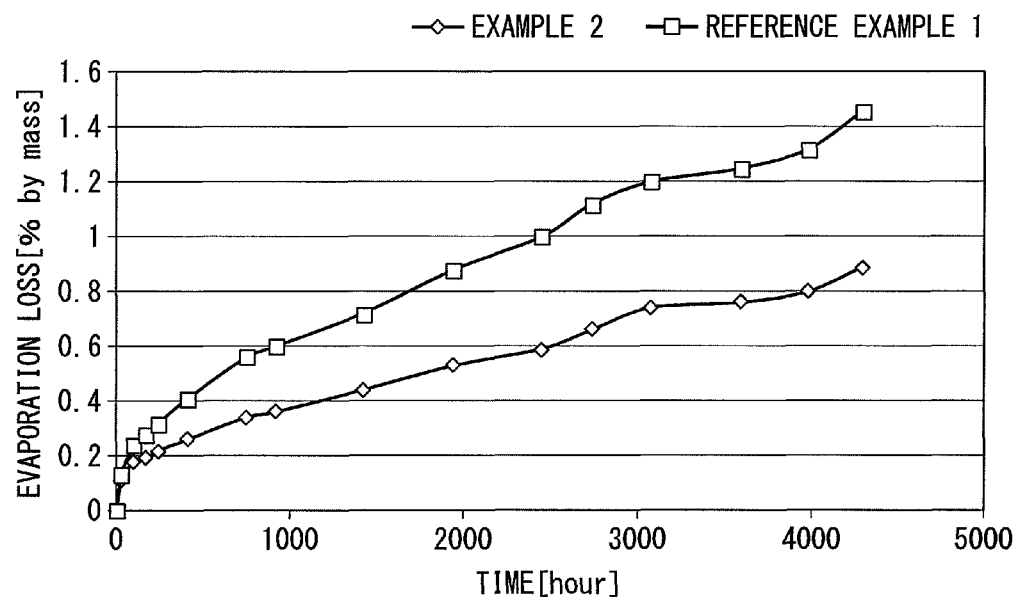
FIG. 7 is a graph illustrating measurement results of a variation of an evaporation loss with the passage of time at 85° C.
Figure 8:
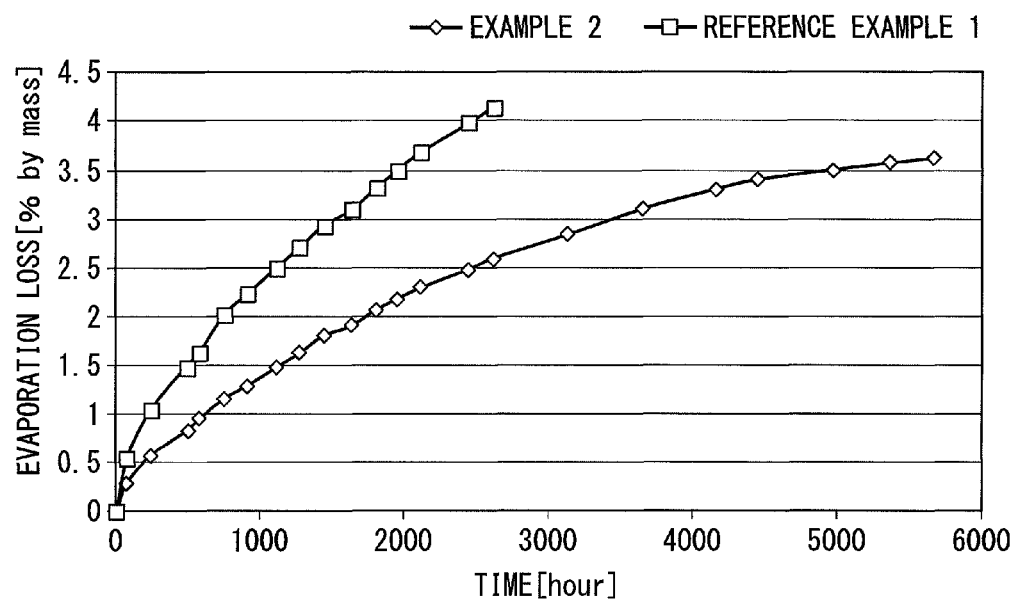
FIG. 8 is a graph illustrating measurement results of a variation of an evaporation loss with the passage of time at 100° C.
Figure 9:
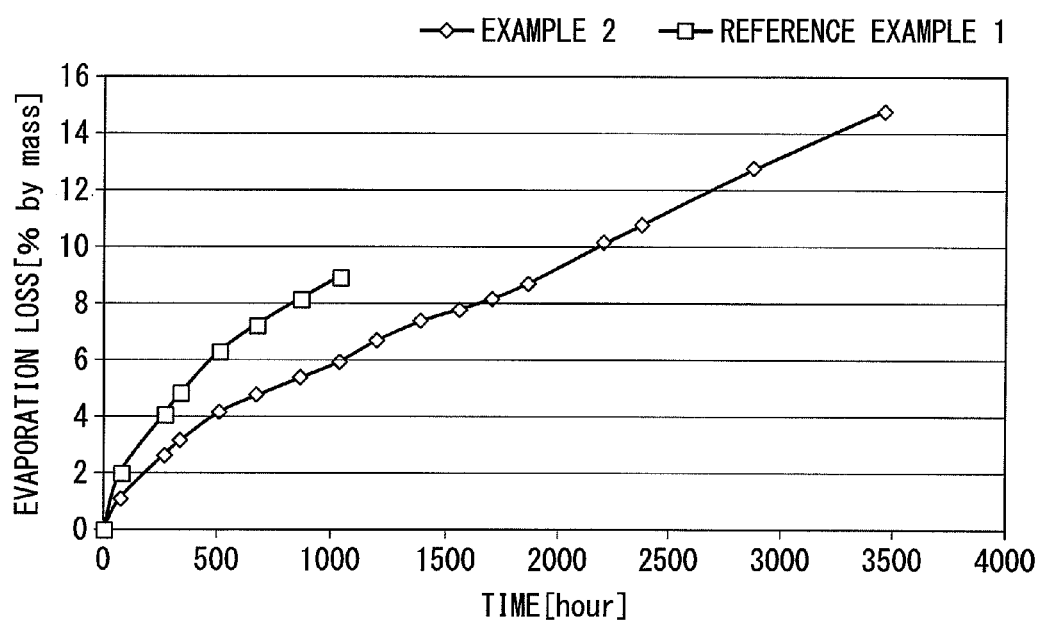
FIG. 9 is a graph illustrating measurement results of a variation of an evaporation loss with the passage of time at 130° C.

Evaporation loss results of each grease is illustrated in FIG. 7 (85° C.), FIG. 8 (100° C.), and FIG. 9 (130° C.) as a graph in which the elapsed time is illustrated on the horizontal axis, and the evaporation loss is illustrated on the vertical axis. It can be said that the smaller the evaporation loss is, the more stable the grease is. As is clear from the graphs, in any temperature condition, the evaporation loss of Example 2 was smaller in comparison to Reference Example 1.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1: Information recording and reproducing apparatus
2: Swing arm
3: Optical waveguide
4: Laser light source
5: Head gimbal assembly
6: Rolling bearing device
7: Actuator
8: Spindle motor
9: Control unit
10: Housing
20: Shaft
21: Sleeve
22: Rolling bearing
30: Inner ring
31: Outer ring
32: Retainer
33: Rolling body
34: Shield plate
B: Ball pocket
G: Grease pocket

What is claimed is:

1. A grease for a rolling bearing, comprising:
a base oil containing a poly-α-olefin and a mineral oil, a mass ratio of poly-α-olefin/mineral oil being 1.25 to 9;
a thickener; and
at least one kind of an antioxidant selected from an amine-based antioxidant (A) expressed by the following general formula (1), and a phenol-based antioxidant (B) expressed by the following general formula (2);

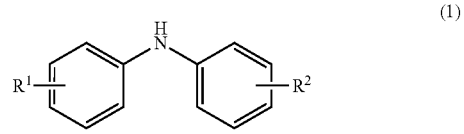

wherein in formula (1), $R^1$ and $R^2$ each independently represents an alkyl group having 1 to 12 carbon atoms, or a hydrogen atom, provided that, at least one of $R^1$ and $R^2$ is an alkyl group having 1 to 12 carbon atoms,

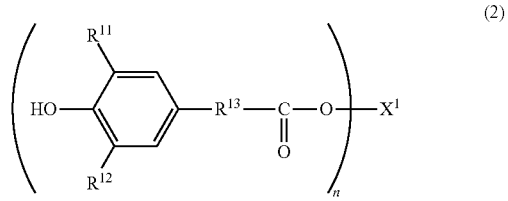

wherein in formula (2), $R^{11}$ and $R^{12}$ each independently represents an alkyl group having 1 to 8 carbon atoms, $R^{13}$ represents an alkylene group having 1 to 8 carbon atoms, n represents a number of 1 to 6, $X^1$ represents a residue obtained after n hydroxyl groups are removed from an aliphatic m-hydric alcohol having 1 to 24 carbon atoms, and m in the aliphatic m-hydric alcohol represents a number of 1 to 6, provided that, when n is 5 or 6, the number of carbon atoms of the aliphatic m-hydric alcohol in $X^1$ is 2 to 24; wherein the mineral oil is a refined mineral oil that is classified as Group III in a base oil category defined by the American Petroleum Institute, and the flash point of the refined mineral oil is 240° C. or higher; and
wherein a kinematic viscosity $v_1$ of the mineral oil at 40° C. is higher than a kinematic viscosity $v_2$ of the poly-α-olefin 40° C.

2. The grease for a rolling bearing according to claim 1, wherein the grease contains both the amine-based antioxidant (A) and the phenol-based antioxidant (B).

3. The grease for a rolling bearing according to claim 2, wherein the amount of the amine-based antioxidant (A) is greater than the amount of the phenol-based antioxidant (B) on a mass basis.

4. The grease for a rolling bearing according to claim 1, wherein the base oil contains a refined mineral oil that is classified as Group III in a base oil category defined by the American Petroleum Institute, and the flash point of the refined mineral oil is 250° C. or higher.

5. The grease for a rolling bearing according to claim 1, wherein the poly-α-olefin is a mixture of trimers to pentamers of α-olefin having 8 to 12 carbon atoms.

* * * * *